US012786801B2

(12) United States Patent
Manolakos et al.

(10) Patent No.: US 12,786,801 B2
(45) Date of Patent: Nov. 3, 2026

(54) MULTIPLE ENERGY HARVESTING BANDWIDTH PARTS

(71) Applicant: QUALCOMM Incorporated, San Diego, CA (US)

(72) Inventors: Alexandros Manolakos, Athens (GR); Ahmed Elshafie, San Diego, CA (US); Ahmed Attia Abotabl, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 228 days.

(21) Appl. No.: 18/681,751

(22) PCT Filed: Aug. 22, 2022

(86) PCT No.: PCT/US2022/041061

§ 371 (c)(1),
(2) Date: Feb. 6, 2024

(87) PCT Pub. No.: WO2023/075901

PCT Pub. Date: May 4, 2023

(65) Prior Publication Data

US 2024/0357429 A1 Oct. 24, 2024

(30) Foreign Application Priority Data

Oct. 29, 2021 (GR) .............................. 20210100748

(51) Int. Cl.
*H04W 28/20* (2009.01)

(52) U.S. Cl.
CPC .................................. *H04W 28/20* (2013.01)

(58) Field of Classification Search
CPC ......... H04W 28/20; H02J 50/00; H02J 50/20; H02J 50/001; H05B 6/72; H01Q 21/06; Y02D 30/70
See application file for complete search history.

(56) References Cited

U.S. PATENT DOCUMENTS

| | | | | |
|---|---|---|---|---|
| 9,985,461 B2 * | 5/2018 | Chen | ....................... | H02J 50/20 |
| 2015/0256015 A1 * | 9/2015 | Gudan | .................. | H02J 50/001 307/104 |

(Continued)

FOREIGN PATENT DOCUMENTS

WO WO-2020236665 A1 11/2020

OTHER PUBLICATIONS

International Search Report and Written Opinion—PCT/US2022/041061—ISA/EPO—Nov. 25, 2022.

(Continued)

*Primary Examiner* — Mohamed A Kamara
(74) *Attorney, Agent, or Firm* — Holland & Hart LLP

(57) ABSTRACT

Methods, systems, and devices for wireless communications are described. A communication device may receive control signaling indicating a configuration for a set of bandwidth parts (BWPs). The set of BWPs may include a first subset of BWPs for wireless communication and a second subset of BWPs for enabling accumulating and storing radio frequency (RF) energy. The first subset of BWPs may include BWPs associated with the second subset of BWPs and configured to be used for sending energy harvesting related information. The communication device may receive the set of BWPs, and over the second subset of BWPs, the communication device may charge a power source associated with the communication device.

27 Claims, 18 Drawing Sheets

(56) References Cited

U.S. PATENT DOCUMENTS

| | | | | |
|---|---|---|---|---|
| 2017/0288473 | A1* | 10/2017 | Choi | H02J 50/00 |
| 2020/0245233 | A1* | 7/2020 | Qian | H04W 48/18 |
| 2020/0367243 | A1* | 11/2020 | Zhang | H04W 24/10 |
| 2022/0225402 | A1* | 7/2022 | Elkotby | H02J 50/001 |

OTHER PUBLICATIONS

Lu W., et al., "Joint Resource Allocation for Wireless Energy Harvesting Enabled Cognitive Sensor Networks", IEEE Access, vol. 6, May 9, 2018, pp. 22480-22488, XP011683253, DOI:10.1109/ACCESS.2018.2827022, Figure 1, p. 22481, 22482, 22486.

Shi Q., et al., "Spectrum Allocation Based on Simultaneous Wireless Information and Power Transfer in Cognitive Radio Networks", Journal Of Physics: Conference Series, Institute Of Physics Publishing, Bristol, GB, vol. 1213, No. 4, Jun. 19, 2019, pp. 1-8, XP020335175, ISSN:1742-6596, DOI:10.1088/1742-6596/1213/4/042046, Figure 1, p. 2,3.

* cited by examiner

MULTIPLE ENERGY HARVESTING BANDWIDTH PARTS

CROSS REFERENCE

The present Application is a 371 national stage filing of International PCT Application No. PCT/US2022/041061 by MANOLAKOS et al. entitled "MULTIPLE ENERGY HARVESTING BANDWIDTH PARTS," filed Aug. 22, 2022; and claims priority to Greece Patent Application No. 20210100748 by MANOLAKOS et al., entitled "MULTIPLE ENERGY HARVESTING BANDWIDTH PARTS," filed Oct. 29, 2021, each of which is assigned to the assignee hereof, and each of which is expressly incorporated by reference in its entirety herein.

TECHNICAL FIELD

The following relates to wireless communications, including harvesting energy from radio frequency communications transmitted between various devices.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems, which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). Some of these communication devices may collect and store radio frequency (RF) energy from RF transmissions (for example, RF signals) between various devices. In some cases, however, the RF transmissions between the various devices may not be configured for RF energy accumulation and, as such, some of these communication devices may not efficiently or effectively accumulate the RF energy.

SUMMARY

The systems, methods and devices of this disclosure each have several innovative aspects, no single one of which is solely responsible for the desirable attributes disclosed herein.

The described techniques relate to methods, systems, devices, and apparatuses that support multiple energy harvesting bandwidth parts (BWPs). A communication device may be configured with one or multiple BWPs for harvesting (for example, accumulating and storing) radio frequency (RF) energy. For example, a communication device may receive control signaling indicating a configuration for a set of BWPs. The set of BWPs may include a first subset of BWPs for wireless communication (for example, for data transmission) and a second subset of BWPs for energy harvesting. In some examples, the first subset of BWPs may include BWPs associated with the second subset of BWPs and configured to be used for sending energy harvesting related information. Examples of energy harvesting related information may include a charging rate, a type of waveform used for energy harvesting, an association between a BWP of the first subset of BWPs and a BWP of the second subset of BWPs, and frequency domain parameters, among other information. The communication device may receive a signal (for example, an RF transmission) over one or multiple BWPs of the second subset of BWPs for energy harvesting. In some examples, the BWPs configured for energy harvesting may yield more power than the BWPs configured for data. By harvesting energy over BWPs configured for energy harvesting, the communication device may charge a power source more efficiently and effectively than harvesting energy from BWPs that may not be configured for energy harvesting.

One innovative aspect of the subject matter described in this disclosure can be implemented in a method for wireless communications at a UE. The method may include receiving control signaling indicating a configuration for a set of BWPs that includes a first subset of BWPs for wireless communication and a second subset of BWPs for energy harvesting, receiving a wireless communication over the first subset of BWPs based at least in part on the configuration, receiving a wireless signal for the energy harvesting over the second subset of BWPs based at least in part on the configuration, and charging a power source associated with the UE based at least in part on the received wireless signal for the energy harvesting.

Another innovative aspect of the subject matter described in this disclosure can be implemented in an apparatus for wireless communications. The apparatus may include a processor, memory coupled with the processor, and instructions stored in the memory. The instructions may be executable by the processor to cause the apparatus to receive control signaling indicating a configuration for a set of BWPs that includes a first subset of BWPs for wireless communication and a second subset of BWPs for energy harvesting, receive a wireless communication over the first subset of BWPs based at least in part on the configuration, receive a wireless signal for the energy harvesting over the second subset of BWPs based at least in part on the configuration, and charge a power source associated with the UE based at least in part on the received wireless signal for the energy harvesting.

Another innovative aspect of the subject matter described in this disclosure can be implemented in an apparatus for wireless communications. The apparatus may include means for receiving control signaling indicating a configuration for a set of BWPs that includes a first subset of BWPs for wireless communication and a second subset of BWPs for energy harvesting, means for receiving a wireless communication over the first subset of BWPs based at least in part on the configuration, means for receiving a wireless signal for the energy harvesting over the second subset of BWPs based at least in part on the configuration, and means for charging a power source associated with the UE based at least in part on the received wireless signal for the energy harvesting.

Another innovative aspect of the subject matter described in this disclosure can be implemented in a non-transitory computer-readable medium storing code for wireless communications at a UE. The code may include instructions executable by a processor to receive control signaling indicating a configuration for a set of BWPs that includes a first subset of BWPs for wireless communication and a second subset of BWPs for energy harvesting, receive a wireless communication over the first subset of BWPs based at least in part on the configuration, receive a wireless signal for the energy harvesting over the second subset of BWPs based at least in part on the configuration, and charge a power source associated with the UE based at least in part on the received wireless signal for the energy harvesting.

One innovative aspect of the subject matter described in this disclosure can be implemented in a method for wireless communications at a device. The method may include transmitting, to a UE, control signaling indicating a configuration for a set of BWPs that includes a first subset of BWPs for wireless communication and a second subset of BWPs for energy harvesting, transmitting, to the UE, a wireless communication over the first subset of BWPs based at least in part on the configuration, and transmitting, to the UE, a wireless signal for the energy harvesting over the second subset of BWPs based at least in part on the configuration.

Another innovative aspect of the subject matter described in this disclosure can be implemented in an apparatus for wireless communications. The apparatus may include a processor, memory coupled with the processor, and instructions stored in the memory. The instructions may be executable by the processor to cause the apparatus to transmit, to a UE, control signaling indicating a configuration for a set of BWPs that includes a first subset of BWPs for wireless communication and a second subset of BWPs for energy harvesting, transmit, to the UE, a wireless communication over the first subset of BWPs based at least in part on the configuration, and transmit, to the UE, a wireless signal for the energy harvesting over the second subset of BWPs based at least in part on the configuration.

Another innovative aspect of the subject matter described in this disclosure can be implemented in an apparatus for wireless communications. The apparatus may include means for transmitting, to a UE, control signaling indicating a configuration for a set of BWPs that includes a first subset of BWPs for wireless communication and a second subset of BWPs for energy harvesting, transmitting, to the UE, a wireless communication over the first subset of BWPs based at least in part on the configuration, and transmitting, to the UE, a wireless signal for the energy harvesting over the second subset of BWPs based at least in part on the configuration.

Another innovative aspect of the subject matter described in this disclosure can be implemented in a non-transitory computer-readable medium storing code for wireless communications at a device. The code may include instructions executable by a processor to transmit, to a UE, control signaling indicating a configuration for a set of BWPs that includes a first subset of BWPs for wireless communication and a second subset of BWPs for energy harvesting, transmit, to the UE, a wireless communication over the first subset of BWPs based at least in part on the configuration, and transmit, to the UE, a wireless signal for the energy harvesting over the second subset of BWPs based at least in part on the configuration.

DETAILED DESCRIPTION

Figure 1:
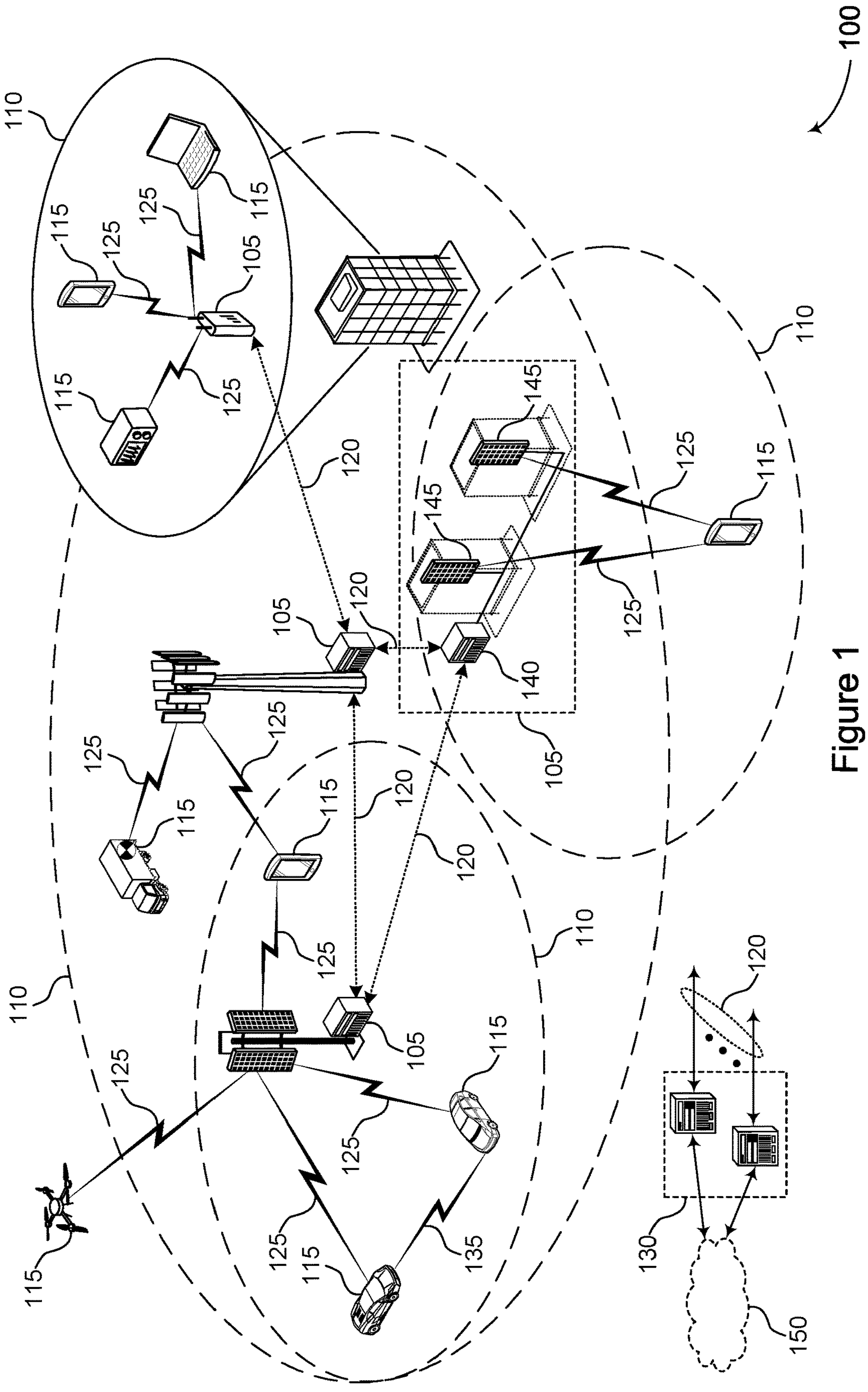
FIGS. 1 and 2 illustrate examples of wireless communications systems that support harvesting energy from radio frequency communications transmitted between various devices in accordance with aspects of the present disclosure.

A communication device may support accumulating and storing radio frequency (RF) energy (which may also be referred to as energy harvesting) to increase a power life and decrease net power consumption of the communication device. In order to harvest the RF energy, the communication device may be configured to use one group of antennas for harvesting the RF energy and another group of antennas for other operations, such as wireless communications involving data. In some cases, the communication device may be configured to split an RF transmission into multiple streams, for example, one stream for harvesting RF energy and another stream for wireless communications. While harvesting the RF energy, power consumed by the communication device may be less than or offset by the harvested RF energy. In some cases, some RF transmissions may not be configured for RF energy harvesting and, as such, the communication device may not efficiently or effectively harvest the RF energy to use for other operations, such as data decoding, data reception, data encoding, or data transmission. This may result in an insufficient amount of RF energy being harvested.

Various aspects generally relate to energy harvesting, including techniques for configuring a communication device with one or multiple BWPs for harvesting RF energy. For example, a UE may receive, from a base station, control signaling indicating a configuration for a set of BWPs. The set of BWPs may include a first subset of BWPs (which may also be referred to as data BWPs) for wireless communication (for example, for data transmission) and a second subset of BWPs (which may also be referred to as energy harvesting BWPs (EH BWPs)) for enabling the harvesting of RF energy. An EH BWP may be a BWP configured for the communication device (e.g., a UE) to receive an RF transmission from another communication device (e.g., a base station or another UE) over the EH BWP and harvest RF energy from the received RF transmission. In some examples, the first subset of BWPs may include BWPs in the second subset of BWPs. The other communication device (e.g., a base station or another UE) may be configured for sending, to the communication device (e.g., a UE), energy harvesting related information. Examples of energy harvesting related information may include a charging rate (for example, an amount of energy accumulated and stored per unit time at the communication device), a waveform used for energy harvesting at the communication device, an association between a data BWP and an EH BWP, and frequency domain parameters, among other examples.

Particular aspects of the subject matter described in this disclosure may be implemented to realize one or more of the following potential advantages. The techniques employed by the described communication devices may result in a relatively higher power yield and a relative decrease in net power consumption. For example, operations performed by the described communication devices may increase power yield by harvesting energy from BWPs configured for energy harvesting. Additionally, the described communication devices may result in a relatively higher power yield by being capable of transmitting and receiving wireless communication (e.g., data) over a data BWP and simultaneously harvesting energy over an EH BWP. In some implementations, the increase in power yield may support decreasing net power consumption, charging a power source, efficient utilization of resources, and longer power source (for example, battery) life.

Aspects of the disclosure are initially described in the context of wireless communications systems. Aspects of the disclosure are then described in the context of three system diagrams and a process flow. Aspects of the disclosure are further illustrated by and described with reference to apparatus diagrams, system diagrams, and flowcharts that relate to harvesting energy from radio frequency communications transmitted between various devices.

FIG. 1 illustrates an example of a wireless communications system 100 that supports harvesting energy from radio frequency communications transmitted between various devices in accordance with aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 for the UEs 115 and the base station 105 to establish one or more communication links 125. The coverage area 110 may be an example of a geographic area that a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (for example, core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (for example, via an S1, N2, N3, or another interface). The base stations 105 may communicate with one another over the backhaul links 120 (for example, via an X2, Xn, or other interface) either directly (for example, directly between base stations 105), or indirectly (for example, via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of that may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, in which the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a BWP) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (for example, in a carrier aggregation configuration), a carrier may also have acquisition signaling or control signaling that coordinates operations for other carriers. A carrier may be associated with a frequency channel (for example, an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode, in which initial acquisition and connection may be conducted by the UEs 115 via the carrier, or the carrier may be operated in a non-standalone mode, in which a connection is anchored using a different carrier (for example, of the same or a different radio access technology). The communication links 125 shown in the wireless communications system 100 may include uplink transmissions from a UE 115 to a base station 105, or downlink transmissions from a base station 105 to a UE 115. Carriers may carry downlink or uplink communications (for example, in an FDD mode) or may be configured to carry downlink and uplink communications (for example, in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (for example, 1.4, 3, 5, 10, 15, 20, 40, or 80 megahertz (MHz)). Devices of the wireless communications system 100 (for example, the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (for example, a sub-band, a BWP) or all of a carrier bandwidth.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol duration (for example, a duration of one modulation symbol) and one subcarrier, in which the symbol duration and subcarrier spacing are inversely related. The number of bits carried by each resource element may depend on the modulation scheme (for example, the order of the modulation scheme, the coding rate of the modulation scheme, or both). The more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

One or more numerologies for a carrier may be supported, in which a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit, which may, for example, refer to a sampling duration of $T_s=1/(\Delta f_{max}\cdot N_f)$ seconds, in which $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some examples, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol durations (for example, depending on the length of the cyclic prefix prepended to each symbol duration). In some wireless communications systems 100, a slot may further be divided into multiple mini-slots containing one or more symbol durations. Excluding the cyclic prefix, each symbol duration may contain one or more (for example, $N_f$) sampling durations. The duration of a symbol duration may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some examples, the TTI duration (for example, the number of symbol durations in a TTI) may be variable. Additionally, or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a number of symbol durations and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (for example, over a carrier) and may be associated with an identifier for distinguishing neighboring cells (for example, a physical cell identifier (PCID), a virtual cell identifier (VCID), or others). In some examples, a cell may also refer to a geographic coverage area 110 or a portion of a geographic coverage area 110 (for example, a sector) that the logical communication entity operates. Such cells may range from smaller areas (for example, a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (for example, several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (for example, licensed, unlicensed) frequency bands as macro cells. Small cells may provide unrestricted access to the UEs 115 with service subscriptions with the network provider or may provide restricted access to the UEs 115 having an association with the small cell (for example, the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (for example, MTC, narrowband IoT (NB-IoT), enhanced mobile broadband (eMBB)) that may provide access for different types of devices.

In some examples, a base station 105 may be movable and provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network, in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (for example, via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (for example, according to narrowband communications), or a combination of these techniques. For example, some UEs 115 may be configured for operation using a narrowband protocol type that is associated with a defined portion or range (for example, set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system, in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (for example, UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (for example, base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (for example, radio heads and ANCs) or consolidated into a single network device (for example, a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (for example, from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams (for example, different codewords). Different spatial layers may be associated with different antenna ports used for channel measurement and reporting. MIMO techniques include single-user MIMO (SU-MIMO), in which multiple spatial layers are transmitted to the same receiving device, and multiple-user MIMO (MU-MIMO), in which multiple spatial layers are transmitted to multiple devices.

Beamforming, which may also be referred to as spatial filtering, directional transmission, or directional reception, is a signal processing technique that may be used at a transmitting device or a receiving device (for example, a base station 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (for example, antenna panels) to conduct beamforming operations for directional communications with a UE 115. Some signals (for example, synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (for example, by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (for example, a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (for example, by a base station 105 or a UE 115) may be performed using multiple beam directions, and the device may use a combination of digital precoding or radio frequency beamforming to generate a combined beam for transmission (for example, from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (for example, a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (for example, for identifying a beam direction for subsequent transmission or reception by the UE 115) or for transmitting a signal in a single direction (for example, for transmitting data to a receiving device).

A receiving device (for example, a UE 115) may try multiple receive configurations (for example, directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (for example, when receiving a data signal). The single receive configuration may be aligned in a beam direction determined based on listening according to different receive configuration directions (for example, a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low signal-to-noise conditions). In some examples, a device may support same-slot HARQ feedback, in which the device may provide HARQ feedback in a specific slot for data received in a previous symbol in the slot. In other cases, the device may provide HARQ feedback in a subsequent slot, or according to some other time interval.

In the wireless communications system, one or more UEs 115 may support various operations for energy harvesting. For example, a UE 115 may harvest energy from many different sources through many different means in the wireless communications system 100. Examples of sources may include solar, vibration, thermal, and RF. In some cases, a UE 115 using solar energy harvesting may use photovoltaic technology, which may have a high power density, but may not be readily available or may be dependent on exposure to light making it non-implantable. A UE 115 using vibration energy harvesting may use one or more of piezoelectric, electrostatic, or electromagnetic technologies, leading to an implantable and highly efficient technology. However, energy harvesting via vibrations, in some cases, may not be available and may have a physical material limitation. A UE 115 using thermal energy harvesting may use one or more of thermoelectric or pyroelectric technologies. These technologies may provide a high power density and be implantable, but may not be available with excess heat. A UE 115 using RF energy harvesting may use antenna technology that is implantable. The RF energy harvesting may be available, but an efficiency of the RF energy harvesting may be inversely proportional to distance, leading to a low power density. Techniques described herein may be in reference to RF energy harvesting. The mention of energy harvesting may be in the context of the energy harvesting type RF energy harvesting.

In some cases, one or more UEs 115 using RF type energy harvesting may support different techniques or schemes for energy harvesting. For example, an energy harvesting technique may include a separated receiver architecture, a time-switching architecture, or a power-splitting architecture. The separated receiver architecture may include an energy harvesting apparatus and an information receiving apparatus separately. For example, the energy harvesting apparatus may include dedicated antennas that may receive RF signals for energy harvesting. The information receiving apparatus may include dedicated antennas separate from the dedicated antennas of the energy harvesting apparatus. The dedicated antennas of the information receiving apparatus may receive data as part of a wireless communication.

A time-switching architecture may allow a network node (e.g., a base station 105) to switch between an energy harvesting apparatus and an information receiving apparatus. In some cases, the switching may depend on a timer, in which an amount of time given for energy harvesting may be static or dynamically indicated. Energy harvested at a receiver (j) from a source (i) may be calculated according to Equation (1) below.

$$E_j = \eta P_i |g_{(i-j)}|^2 \alpha T \tag{1}$$

In Equation (1), E represents energy harvested, n represents an efficiency of energy harvesting, $P_i$ represents a transmit power from the source, $g_{(i-j)}$ represents a channel coefficient between the source (i) and the receiver (j), and αT represents a time switching ratio, in which 0≤α≤1 is the fraction of time allocated for energy harvesting. In some cases, a data rate for the time-switching architecture may be calculated according to Equation (2) below.

$$R_{i-j} = (1-\alpha)\log_2\left(1 + \frac{P_i |g_{(i-j)}|^2}{\kappa W}\right) \tag{2}$$

In Equation (2), $R_{i-j}$ represents the data rate, κ represents a noise spectral density, and W represents a channel bandwidth.

A power-splitting architecture may allow a network node (e.g., a base station 105) to split a received RF signal into two streams. A first stream may be for an information receiving apparatus and a second stream may be for an energy harvesting apparatus with different power levels. In some cases, energy harvested at a receiver (j) from a source (i) may be calculated according to Equation (3) below:

$$E_j = \eta \rho P_i |g_{(i-j)}|^2 T \tag{3}$$

In Equation (3), 0≤ρ≤1 represents a fraction of power allocated for energy harvesting. In some cases, a data rate for the power-splitting architecture may be calculated according to Equation (4) below.

$$R_{i-j} = \log_2\left(1 + \frac{|g_{(i-j)}|^2 (1-\rho) P_i}{\kappa W}\right) \tag{4}$$

In some cases, harvesting RF energy may be used to charge a device (for example, a wearable device, a smart watch, a very low power device, and a UE 115, among others). In these cases, a purpose of harvesting the RF energy may be to use the harvested energy in running one or more tasks. The one or more tasks may include data decoding, data encoding, operating some filters, data reception, and data transmission, among others. The purpose may not be to charge a battery of the UE 115 in full, but the purpose may be to charge the battery of the UE 115 (or charge some dedicated battery for energy harvesting) in a way that the one or more tasks may be performed through accumulation of energy over time. These cases may be applied in a self-sustainable network, in which a node in the wireless communications system 100 may operate through the energy harvested in the wireless communications system 100 through RF transmissions.

In some cases, RF energy harvesting may be implemented in an internet of things (IoT) environment. For example, an ultra-low power wake-up radio (ULP WUR) may use energy harvesting to provide a longer battery lifespan for IoT devices (such as, a UE 115) with batteries. For battery-less IoT devices (for example, medical sensors, implanted sensors, and more), a ULP WUR may use energy harvesting to function. In some cases, while accumulating RF energy, power consumed by a UE 115 may be less than the accumulated RF energy. In some cases, some RF transmissions may not be configured for RF energy accumulation and, as such, the UE 115 may not efficiently harvest the RF energy to use for other operations, such as data decoding, data reception, data encoding, data transmission. This may result in an insufficient amount of RF energy harvested.

In some examples, as part of energy harvesting, a UE 115 (for example, a wearable device, an IoT device, among others) may receive control signaling indicating a configuration of multiple BWPs for energy harvesting through data BWPs. In some examples, the data BWPs may include BWPs associated with EH BWPs and configured to be used for sending energy harvesting related information. Examples of energy harvesting related information includes a charging rate, a type of waveform used for powering the UE 115, an association between a data BWP and an EH BWP, and frequency domain parameters, among other information. In some examples, the EH BWPs may yield higher power than the data BWPs. By harvesting energy from EH BWPs, the UE 115 may charge a power source (for example, a battery) more efficiently than harvesting energy from data BWPs.

For example, energy transfer from a base station 105 to a UE 115 may be done on a data BWP. In such cases, the UE 115 may apply a time switching (for example, energy symbols can be added to a TDD pattern) or a power splitting, in which the UE 115 splits the input power, which may cause signal to interference plus noise ratio (SINR) reduction and a different modulation and coding scheme (MCS) to harvest energy. However, using a data BWP for energy harvesting may have a much lower power yield than dedicated resources for energy harvesting. EH BWPs, which are configured for the purpose of energy harvesting, may have denser energy symbols (for example, slots) for energy harvesting. In this way, RF energy harvesting may enable a prolonging of the battery's lifetime. In some examples, the energy harvesting configuration may be used as an incentive for multiple UEs 115 in the wireless communications system 100 to cooperate with each other by relaying signals to other UEs 115 to help in allowing for recycling of network energy such that the wireless communications system 100 may be self-sustainable (for example, at least part of the RF energy used in the wireless communications system 100 can be harvested by UEs 115).

Figure 2:
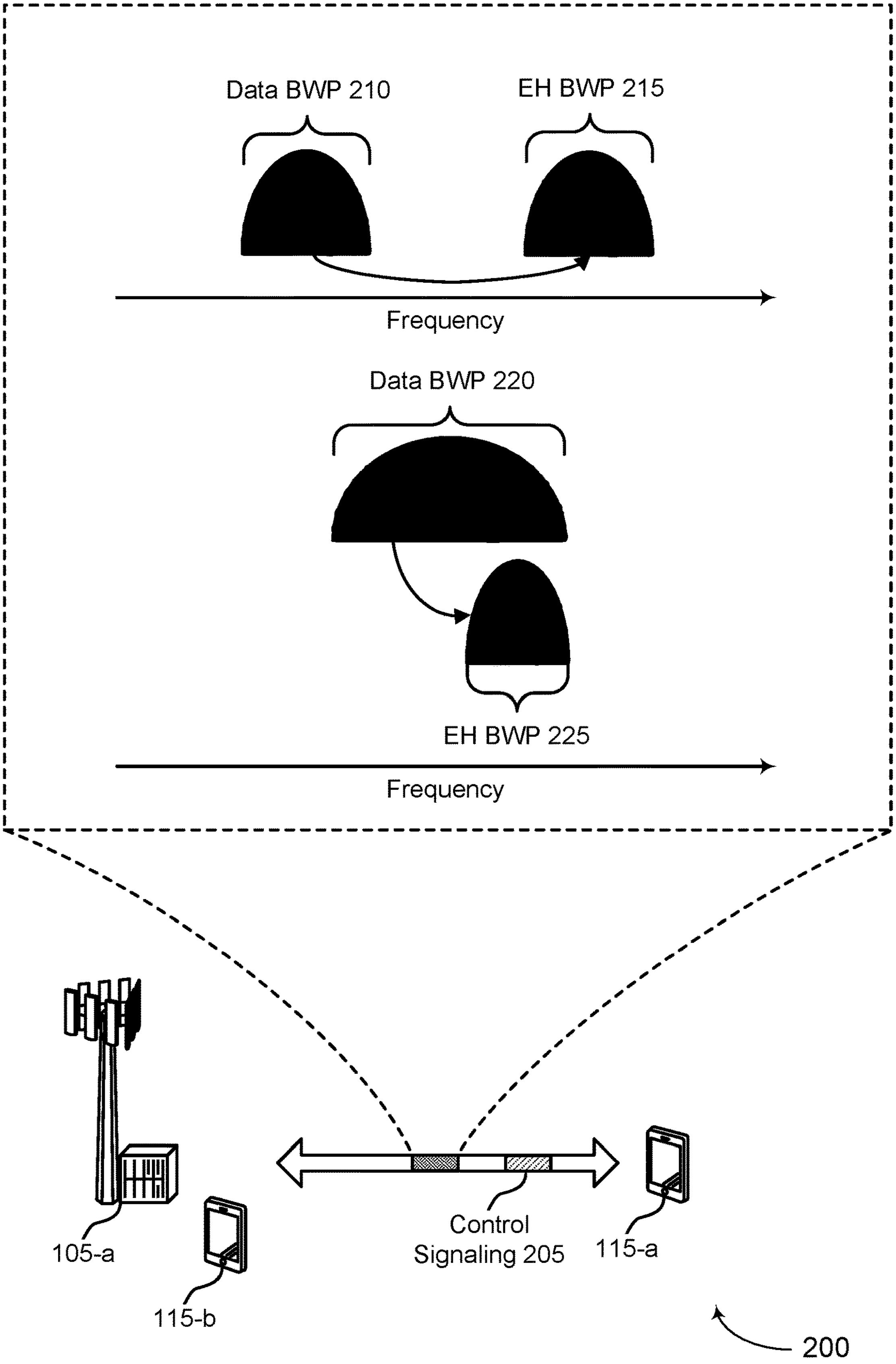

FIG. 2 illustrates an example of a wireless communications system 200 that supports harvesting energy from radio frequency communications transmitted between various devices in accordance with aspects of the present disclosure. In some examples, the wireless communications system 200 may implement or be implemented by aspects of the wireless communications system 100. The wireless communications system 200 may include a base station 105-*a*, a UE 115-*a*, and a UE 115-*b* which may be an example of a base station 105 and a UE 115, as described in FIG. 1. In some cases, the UE 115-*a* may be an example of a wearable device, a smart watch, an IoT device, among other examples.

One or both of the base station 105-*a* or the UE 115-*b* may be in wireless communication with the UE 115-*a*. The UE 115-*a* may support energy harvesting procedures to extend a battery life of the UE 115-*a*. In some examples, while accumulating RF energy, power consumed by the UE 115-*a* may be less than the accumulated RF energy. However, some RF transmissions may not be configured for the energy harvesting procedures and, as such, the RF transmissions may not allow for efficient energy harvesting. This may result in an insufficient amount of RF energy harvested to perform some operations, such as data decoding, data encoding, data reception, and data transmission, among others. To avoid such issues, the base station 105-*a* may configure the UE 115-*a* with different types of BWPs (for example, component carriers, bands, among other examples). For example, one or both of the base station 105-*a* or the UE 115-*b* may transmit control signaling 205 to the UE 115-*a*. The control signaling 205 may indicate a configuration for a set of BWPs that includes a first subset of BWPs (referred to as data BWPs) for wireless communication and a second subset of BWPs for energy harvesting (referred to as EH BWPs).

The UE 115-*a* may monitor the data BWPs for information about the EH BWPs. The information may include association information from an EH BWP to a data BWP. For example, a data BWP 210 may be associated with an EH BWP 215 and a data BWP 220 may be associated with an EH BWP 225. The data BWP 210 and the EH BWP 215 may illustrate an example of frequency division duplexed (FDD) BWPs and the data BWP 220 and the EH BWP 225 may illustrate an example of time division duplexed (TDD) BWPs. In some cases, the EH BWP 225 may fully or partially overlap with the data BWP 220 in the frequency domain. In some examples, the data BWP 210 and the data BWP 220 may be examples of the first subset of BWPs and the EH BWP 215 and the EH BWP 225 may be examples of the second subset of BWPs.

In some examples, EH BWPs may have denser energy symbols or slots for energy harvesting than data BWPs. The EH BWPs may have very sparse downlink slots or symbols, or flexible slots or symbols. The flexible slots or symbols may be overwritten (for example, reconfigured, reallocated, or reassigned) with downlink slots or symbols, or uplink slots or symbols, or sidelink slots or symbols. The downlink slots or symbols may be used by the base station 105-*a* to send control information (for example, the control signaling 205) to the UE 115-*a*. Alternatively, the sidelink slots or symbols may be used by the UE 115-*b* to send control information (for example, the control signaling 205). The uplink slots (sidelink slots) or symbols may be used by the UE 115-*a* to send feedback to one or both of the base station 105-*a* or the UE 115-*b*. In general, EH BWPs may be used in an analog domain, such that the UE 115-*a* may refrain from monitoring the EH BWPs for information.

The base station 105-*a* may send information to the UE 115-*a* over one or more EH BWPs. For example, during a mission critical transmission, the base station 105-*a* may indicate to the UE 115-*a* that the base station 105-*a* may send information on the EH BWP 215. The UE 115-*a* may then monitor the EH BWP 215 for information. In some examples, the base station 105-*a* may send the indication on the data BWP 210 (for example, based on a coordination between one or both of the base station 105-*a* or the UE 115-*b* and the UE 115-*a* about the data BWP 210) a number of symbols before the information is sent on the EH BWP 215. In some examples, one or both of the base station 105-*a* or the UE 115-*b* may configure the UE 115-*a* such that each EH BWP may have associated configuration information. For example, the data BWP 210 associated with the EH BWP 215 may include the associated configuration information.

The associated configuration information may include one or more of the following: a charging rate, a waveform type used by one or both of the base station 105-*a* or the UE 115-*b* for powering the UE 115-*a*, frequency domain parameters, association information, and a frame, slot, or symbol structure (for example, a TDD slot pattern). In some examples, the charging rate may be an energy transfer amount that the UE 115-*a* may receive when using the EH BWP 215. In some examples, the charging rate may be a target rate that an RF transmission from one or both of the base station 105-*a* or the UE 115-*b* may provide to the UE 115-*a*, or a target rate that the UE 115-*a* may attempt to achieve based on the received RF transmission over the EH BWP 215. The frequency domain parameters may include a bandwidth and a location in frequency with respect to a point (point-A). The frame, slot, or symbol structure may be associated with the EH BWP 215 for the purpose of identifying a location of portions of the EH BWP 215 to be used for EH (for example, energy harvesting symbols, slots, subframes, groups of slots, or any combination thereof).

In some examples, one or both of the base station 105-*a* or the UE 115-*b* may configure (for example, associate, assign, allocate) each EH BWP according to a structure from multiple frame, slot, or symbol structures. For example, one or both of the base station 105-*a* or the UE 115-*b* may dynamically indicate to the UE 115-*a*, via an energy harvesting slot format indicator (SFI), a high-layer configured frame, slot, or symbol structure for the EH BWP 215. The configured frame, slot, or symbol structure for the EH BWP 215 may provide a higher power yield than the data BWP 210. Additionally, or alternatively, one or both of the base station 105-*a* or the UE 115-*b* may configure the UE 115-*a* with multiple frame, slot, or symbol structures (for example, via RRC for each EH BWP). For each EH BWP or particular EH BWPs, the UE 115-*a* may recommend a frame, slot, or symbol structure from the multiple frame, slot, or symbol structures configured, or select one from the multiple frame, slot, or symbol structures configured in RRC for each EH BWP. In this way, the EH BWP 215 may be configured for energy harvesting (a power yield for the UE 115-*a* or for the UE 115-*a* to send to other UEs 115 in sidelink communication) of the UE 115-*a*. For example, the data BWP 210 may include a portion allocated for energy harvesting. The UE 115-*a* may signal to the base station 105-*a* an EH BWP to be used via the allocated portion. In some examples, the UE 115-*a* may determine an EH BWP to be the EH BWP 215 based on a charging rate of the EH BWP 215 satisfying a charging rate of the UE 115-*a* or based on channel state information (CSI) collected on the EH BWP 215.

In some examples, one or both of the base station 105-*a* or the UE 115-*b* may communicate information about changes for the EH BWPs (for example, changes to the frame, slot, or symbol structure or changes to charging rates) outside of downlink control information (DCI) monitoring behavior. For example, the base station 105-*a* may configure the data BWP 210 to be used for sending energy harvesting related information. The energy harvesting related information may include changes to the structure of the EH BWP 215, the charging rate of the EH BWP 215, or other information. In some examples, the UE 115-*a* may communicate charging rates for the UE 115-*a* and other energy harvesting related information through the configured data BWP in an uplink communication. In this way, the EH BWP 215 may be configured without DCI monitoring behavior, which may decrease overhead and power consumption.

In the wireless communications system 100, the UE 115-*a* may increase a battery life by supporting one or multiple energy harvesting BWPs over which the UE 115-*a* may receive wireless signals (for example, RF transmissions) for energy harvesting.

Figure 3A:
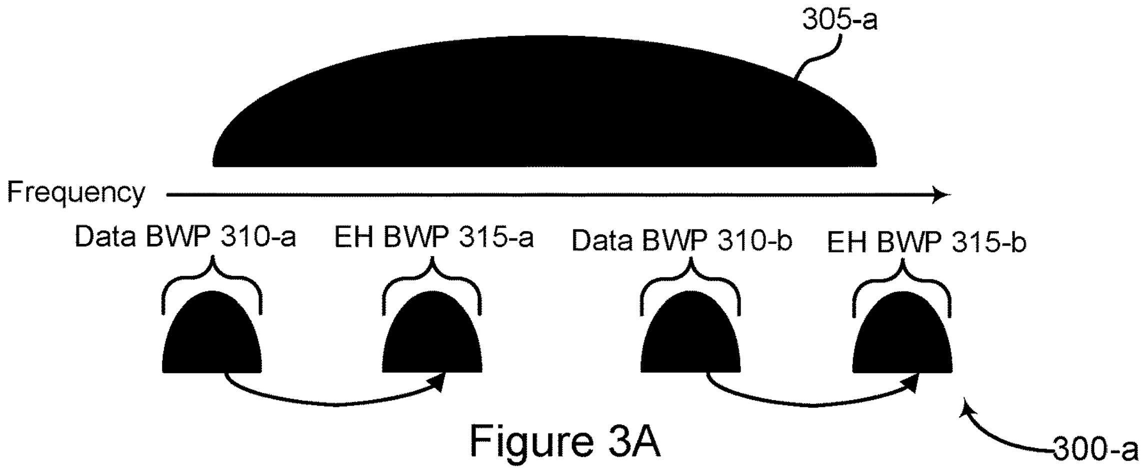
FIGS. 3A-3C illustrate examples of configurations that support harvesting energy from radio frequency communications transmitted between various devices in accordance with aspects of the present disclosure.
Figure 3B:
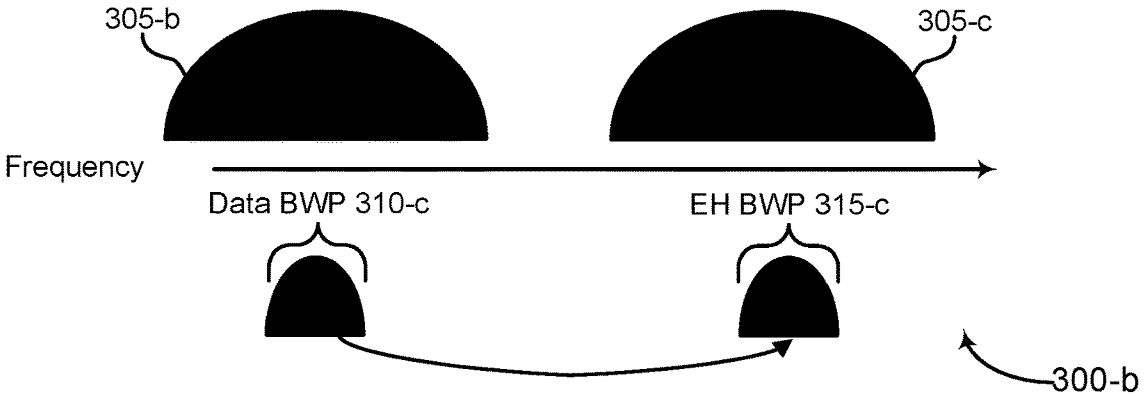
Figure 3C:
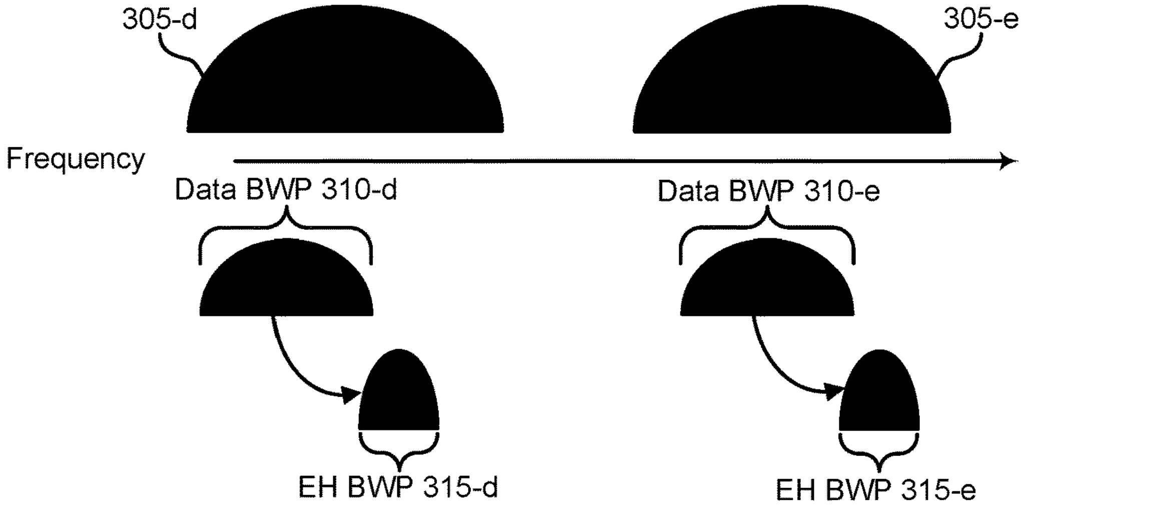

FIGS. 3A, 3B, and 3C illustrate examples of a configuration 300-*a*, a configuration 300-*b*, and a configuration 300-*c* respectively, that support harvesting energy from radio frequency communications transmitted between various devices in accordance with aspects of the present disclosure. In some examples, the configuration 300-*a*, the configuration 300-*b*, and the configuration 300-*c* may implement or be implemented by aspects of the wireless communications system 100 and the wireless communications system 200, as described in in FIGS. 1 and 2. For example, one or more of the configuration 300-*a*, the configuration 300-*b*, and the configuration 300-*c* may be implemented by one or both of a base station 105 or a UE 115 to support energy harvesting over one or multiple energy harvesting BWPs.

A base station 105 or a UE 115 may configure another UE 115 with multiple EH BWPs. A maximum number of EH BWPs that the other UE 115 may simultaneously be configured with may be based on a UE capability (for example, corresponding to different services). The number of EH BWPs may be implicitly associated with data BWPs, in which a determination of which EH BWPs are used may be based on the associated data BWP (for example, component carrier or band). For example, the base station 105 or the UE 115 may configure the other UE 115 for energy harvesting. By activating energy harvesting, the other UE 115 may implicitly associate a data BWP with an EH BWP. Implicitly associated BWPs may occur in a single component carrier or over multiple component carriers, and may include frequency division duplexed (FDD) or time division duplexed (TDD) BWPs such that the data BWPs and the EH BWPs are overlapping, partially overlapped, or separate from each other in frequency.

In the example of FIG. 3A, a UE 115 may determine an implicit association between a data BWP 310-*a* and an EH BWP 315-*a* and a data BWP 310-*b* and an EH BWP 315-*b*. For example, a base station 105 may configure a UE 115 with a set of BWPs over a single component carrier 305-*a*. The set of BWPs may include a first subset of data BWPs including a data BWP 310-*a* and a data BWP 310-*b*, and a second subset of EH BWPs including an EH BWP 315-*a* and an EH BWP 315-*b*. The UE 115 may implicitly associate the data BWP 310-*a* with the EH BWP 315-*a* and the data BWP 310-*b* with the EH BWP 315-*b*. The implicit association may be based on the single component carrier 305-*a* or the data BWPs.

In the example of FIG. 3B, a UE 115 may determine an implicit association between a data BWP 310-*c* and an EH BWP 315-*c*. For example, a base station 105 may configure the UE 115 with a set of BWPs over a first component carrier 305-*b* and a second component carrier 305-*c*. The set of BWPs may include the data BWP 310-*c* and the EH BWP 315-*c*. The UE 115 may implicitly associate the data BWP 310-*c* with the EH BWP 315-*c*. The implicit association may be based on a band, the first component carrier 305-*b*, the second component carrier 305-*c* or the data BWP 310-*c*. The examples illustrated in FIG. 3A and FIG. 3B may be implemented by a UE 115 using one or both of a time-switching architecture or a separated receiver architecture, as described in FIG. 1.

In the example of FIG. 3C, a UE 115 may determine an implicit association between a data BWP 310-*d* and an EH BWP 315-*d*, and a data BWP 310-*e* and an EH BWP 315-*e*. For example, a base station 105 may configure the UE 115 with a set of BWPs over a first component carrier 305-*d* and a second component carrier 305-*e*. The set of BWPs may include a first subset of data BWPs including a data BWP 310-*d* and a data BWP 310-*e*, and a second subset of EH BWPs including an EH BWP 315-*d* and an EH BWP 315-*e*. In some examples, EH BWPs of the second subset of EH BWPs may partially or completely overlap with data BWPs of the first subset of data BWPs. The UE 115 may implicitly associate the data BWP 310-*d* with the EH BWP 315-*d* and the data BWP 310-*e* with the EH BWP 315-*e*. The implicit association may be based on a bang, the first component carrier 305-*d*, the second component carrier 305-*e*, the data BWP 310-*d*, or the data BWP 310-*e*. The example illustrated in FIG. 3C may be implemented by a UE 115 using one or both of a power-splitting architecture or a separated receiver architecture, as described in FIG. 1.

Figure 4A:
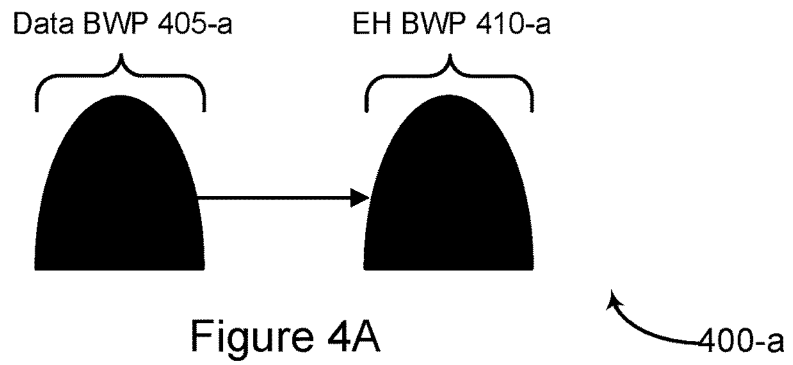
FIGS. 4A-4C illustrate examples of configurations that support harvesting energy from radio frequency communications transmitted between various devices in accordance with aspects of the present disclosure.
Figure 4B:
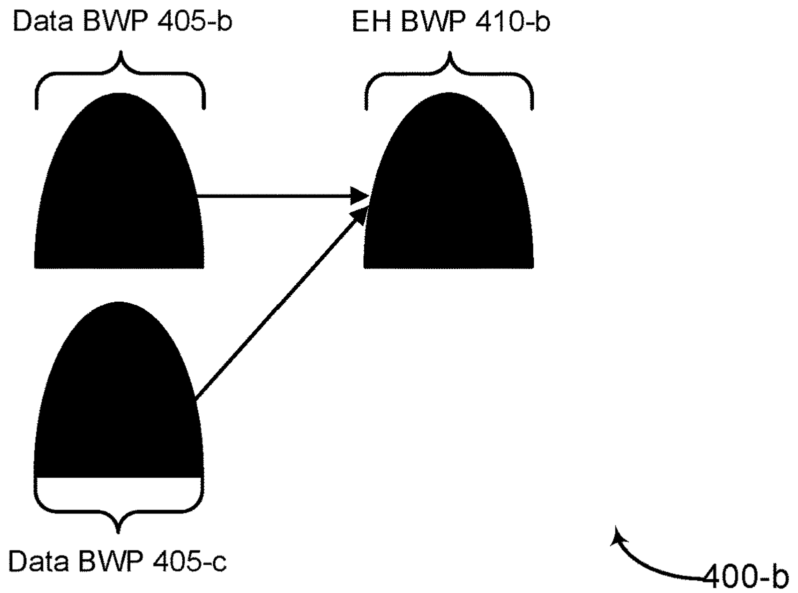
Figure 4C:
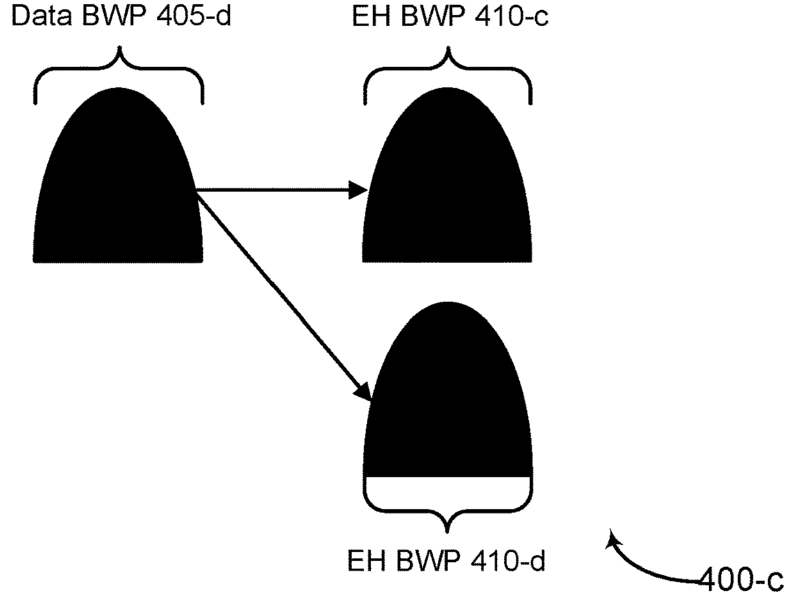

FIGS. 4A, 4B, and 4C illustrate examples of a configuration 400-*a*, a configuration 400-*b*, and a configuration 400-*c*, that support harvesting energy from radio frequency communications transmitted between various devices in accordance with aspects of the present disclosure. In some examples, the configuration 400-*a*, the configuration 400-*b*, and the configuration 400-*c* may implement or be implemented by aspects of the wireless communications system 100, as described in FIG. 1. For example, one or more of the configuration 400-*a*, the configuration 400-*b*, or the configuration 400-*c* may be implemented by one or both of a base station 105 or a UE 115 to support energy harvesting over one or multiple energy harvesting BWPs. The base station 105 may configure the UE 115 with a set of BWPs. The set of BWPs may include a first subset of data BWPs and a second subset of EH BWPs. The base station 105 may configure a data BWP of the first subset of data BWPs to be used for sending energy harvesting related information to an EH BWP of the second subset of EH BWPs. In order to send the energy harvesting related information, there may be an association between the data BWP and the EH BWP.

FIG. 4A may illustrate an example of an implicit or explicit association between a data BWP 405-*a* and an EH BWP 410-*a*. The association may be an example of a one-to-one mapping between the data BWP 405-*a* and the EH BWP 410-*a*. In some examples, the association between the data BWP 310-*a* and the EH BWP 315-*a*, as described in FIGS. 3A-3C, may be an example of the one-to-one mapping.

FIG. 4B may illustrate an example of an implicit or explicit association between an EH BWP 410-*b* and a data BWP 405-*b* and a data BWP 405-*c*. The association may be an example of a many-to-one mapping between the EH BWP 410-*b* and the data BWP 405-*b* and the data BWP 405-*c*. In some examples, energy harvesting related information for the EH BWP 410-*b* may be shared between the data BWP 405-*b* and the data BWP 405-*c*, in which the data BWPs may be downlink BWPs.

FIG. 4C may illustrate an example of an implicit or explicit association between a data BWP 405-*d* and an EH BWP 410-*c* and an EH BWP 410-*d*. The association may be an example of a one-to-many mapping between the data BWP 405-*d* and the EH BWP 410-*c* and the EH BWP 410-*d*. In some examples, the data BWP 405-*b* may include energy harvesting related information for both the EH BWP 410-*c* and the EH BWP 410-*d*.

In the examples of FIGS. 4A-4C, the association mappings may be pre-configured, configured, or dynamically configured. For example, a UE 115 may be pre-configured (based on a UE capability) to associate a data BWP with an EH BWP according to the one-to-one mapping. A base station 105 may configure the UE 115 via an RRC or MAC-CE message to associate the data BWP with the EH BWP according to the one-to-one mapping. Additionally or alternatively, the base station 105 may dynamically configure the UE 115 via a DCI message to associate the data BWP with the EH BWP according to the one-to-one mapping.

Figure 5:
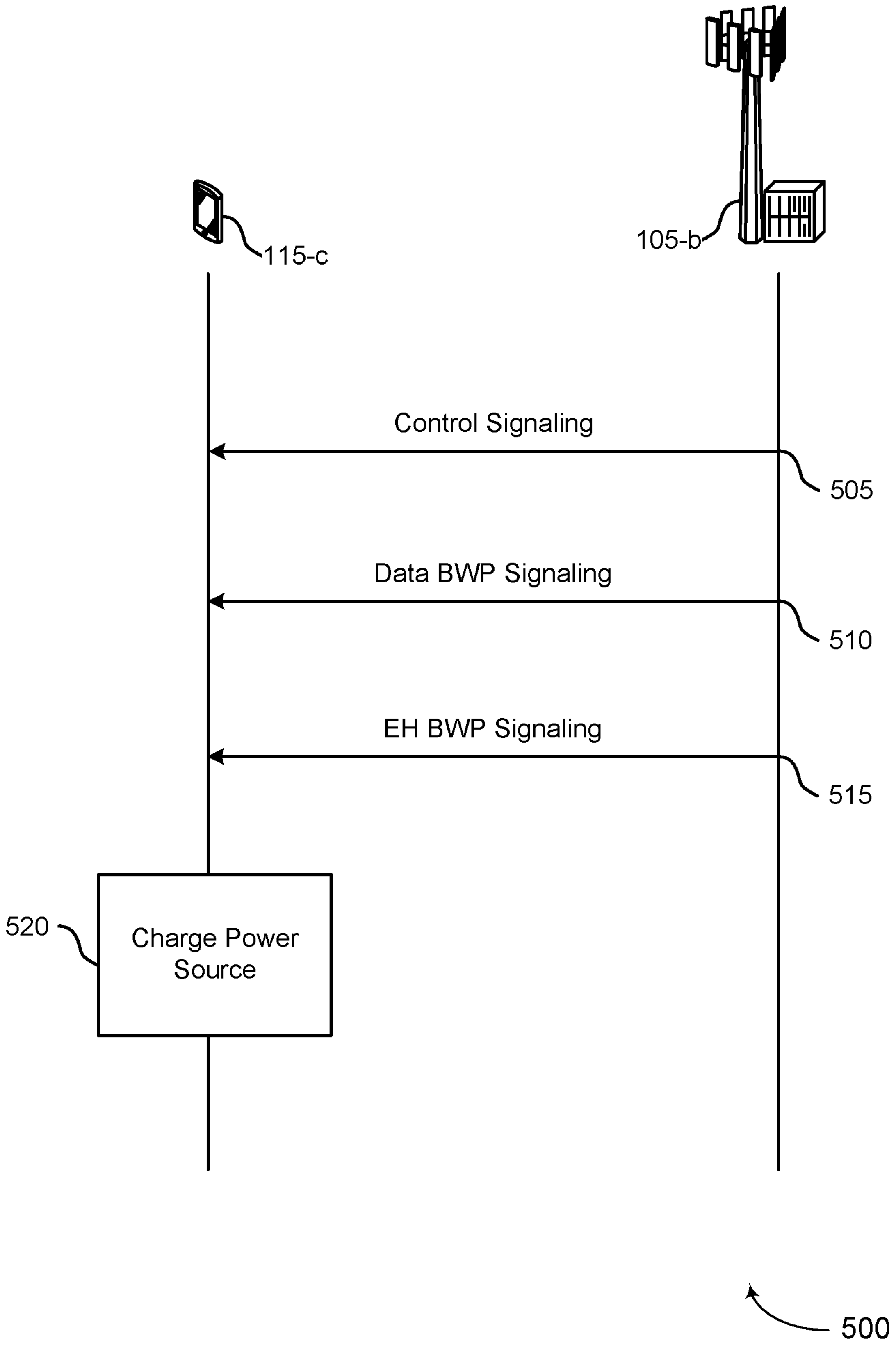
FIG. 5 illustrates an example of a process flow that supports harvesting energy from radio frequency communications transmitted between various devices in accordance with aspects of the present disclosure.

FIG. 5 illustrates an example of a process flow 500 that supports harvesting energy from radio frequency communications transmitted between various devices in accordance with aspects of the present disclosure. The process flow 500 may implement or be implemented by aspects of the wireless communications system 100 or the wireless communications system 200. For example, the process flow 500 may include a base station 105-*b* and a UE 115-*c*, which may be examples of corresponding devices described with reference to FIGS. 1 and 2. In the following description of the process flow 500, some operations may be omitted from the process flow 500, and other operations may be added to the process flow 500.

At 505, the base station 105-*b* may transmit to the UE 115-*c* control signaling. The control signaling may indicate a configuration for a set of BWPs. The set of BWPs may include a first subset of BWPs for wireless communication and a second subset of BWPs for EH. In some examples, the first subset of BWPs may be examples of data BWPs and the second subset of BWPs may be examples of EH BWPs, as described in FIGS. 1-4.

At 510, the base station 105-*b* may transmit to the UE 115-*c* data BWP signaling. In some examples, the data BWP signaling may be based on the configuration from the control signaling. The data BWP signaling may include energy harvesting information, such as an energy rate for energy harvesting, a waveform associated with the second subset of BWPs for energy harvesting, an association between the first subset of BWPs and the second subset of BWPs, and a set of resource patterns (for example, a frame, slot, or symbol structure) associated with the second subset of BWPs, among other information.

At 515, the base station 105-*b* may transmit to the UE 115-*c* EH BWP signaling. In some examples, the EH BWP signaling may be a wireless signal for energy harvesting over the second subset of BWPs. In some examples, resources of the second subset of BWPs may be based on a determined resource pattern of the set of resource patterns. The determined resource pattern may include a TDD slot pattern that has fewer downlink slots than uplink slots or flexible slots. The determined resource pattern may be configured for energy harvesting and may have denser energy symbols than a resource pattern associated with the first subset of BWPs. When harvesting RF energy, the denser energy symbols may allow for a higher power yield than harvesting RF energy from the first subset of BWPs.

At 520, the UE 115-*c* may charge a power source associated with the UE 115-*c* based on power harvested from the received EH BWP signaling. Because the received EH BWP signaling was configured for energy harvesting the power harvested may be higher than energy harvested from signaling not configured for energy harvesting (for example, the first subset of BWPs). This may support a more efficient charging of the power source at the UE 115-*c*.

Figure 6:
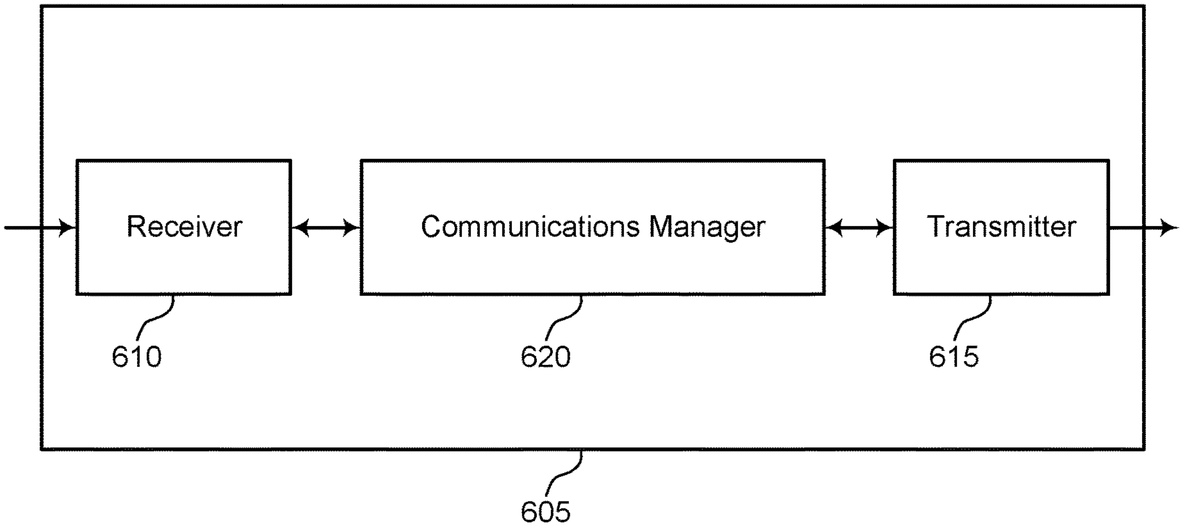
FIGS. 6 and 7 show block diagrams of devices that support harvesting energy from radio frequency communications transmitted between various devices in accordance with aspects of the present disclosure.

FIG. 6 shows a block diagram of a device 605 that supports harvesting energy from radio frequency communications transmitted between various devices in accordance with aspects of the present disclosure. The device 605 may be an example of aspects of a UE 115. The device 605 may include a receiver 610, a transmitter 615, and a communications manager 620. The communications manager 620 can be implemented, at least in part, by one or both of a modem and a processor. Each of these components may be in communication with one another (for example, via one or more buses).

The receiver 610 may provide a means for receiving information such as packets, user data, control information, or any combination thereof associated with various information channels (for example, control channels, data channels, information channels related to multiple energy harvesting BWPs). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (for example, control channels, data channels, information channels related to multiple energy harvesting BWPs). In some examples, the transmitter 615 may be co-located with a receiver 610 in a transceiver component. The transmitter 615 may utilize a single antenna or a set of multiple antennas.

The communications manager 620, the receiver 610, the transmitter 615, or various combinations thereof or various components thereof may be examples of means for performing various aspects of multiple energy harvesting BWPs. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (for example, in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (for example, by executing, by the processor, instructions stored in the memory).

Additionally or alternatively, in some examples, the communications manager 620, the receiver 610, the transmitter 615, or various combinations or components thereof may be implemented in code (for example, as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (for example, configured as or otherwise supporting a means for performing the functions described in the present disclosure).

In some examples, the communications manager 620 may be configured to perform various operations (for example, receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations.

The communications manager 620 may support wireless communication at the device 605 (for example, a UE) in accordance with examples as disclosed herein. For example, the communications manager 620 may be configured as or otherwise support a means for receiving control signaling indicating a configuration for a set of BWPs that includes a first subset of BWPs for wireless communication and a second subset of BWPs for energy harvesting. The communications manager 620 may be configured as or otherwise support a means for receiving a wireless communication over the first subset of BWPs based on the configuration. The communications manager 620 may be configured as or otherwise support a means for receiving a wireless signal for the energy harvesting over the second subset of BWPs based on the configuration. The communications manager 620 may be configured as or otherwise support a means for charging a power source associated with the device 605 based on the received wireless signal for the energy harvesting.

By including or configuring the communications manager 620 to support techniques for multiple energy harvesting BWPs, the device 605 (for example, a processor controlling or otherwise coupled to the receiver 610, the transmitter 615, the communications manager 620, or a combination thereof) may increase a battery life by harvesting energy from a wireless signal transmitted over one or multiple energy harvesting BWPs.

Additionally or alternatively, the communications manager 620 may be configured as or otherwise support a means for transmitting, to another UE, control signaling indicating a configuration for a set of BWPs that includes a first subset of BWPs for wireless communication and a second subset of BWPs for energy harvesting. The communications manager 620 may be configured as or otherwise support a means for transmitting, to the other UE, a wireless communication over the first subset of BWPs based at least in part on the configuration. The communications manager 620 may be configured as or otherwise support a means for transmitting, to the other UE, a wireless signal for the energy harvesting over the second subset of BWPs based at least in part on the configuration.

Figure 7:
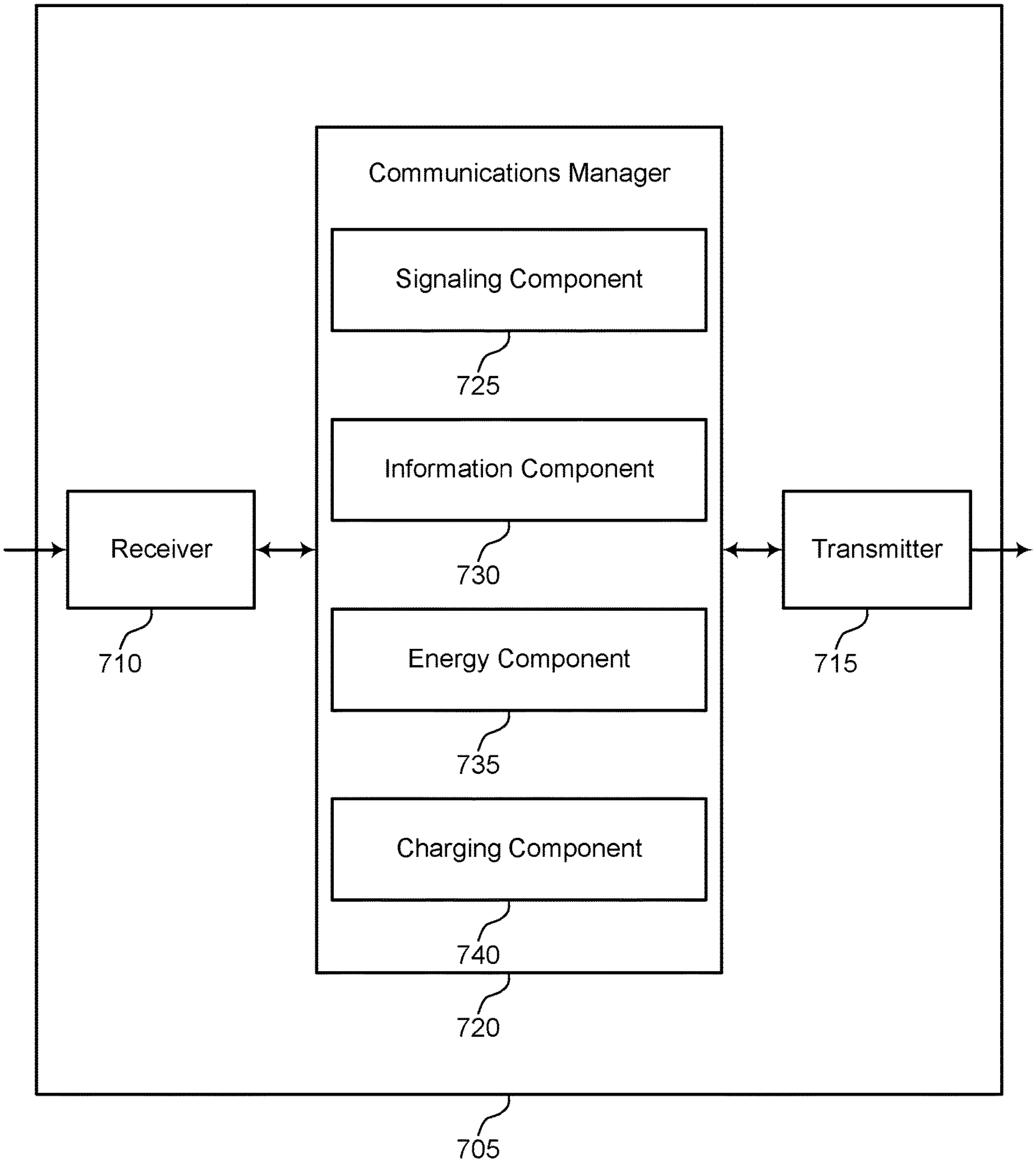

FIG. 7 shows a block diagram of a device 705 that supports harvesting energy from radio frequency communications transmitted between various devices in accordance with aspects of the present disclosure. The device 705 may be an example of aspects of a device 605 or a UE 115. The device 705 may include a receiver 710, a transmitter 715, and a communications manager 720. The communications manager 720 can be implemented, at least in part, by one or both of a modem and a processor. Each of these components may be in communication with one another (for example, via one or more buses).

The receiver 710 may provide a means for receiving information such as packets, user data, control information, or any combination thereof associated with various information channels (for example, control channels, data channels, information channels related to multiple energy harvesting BWPs). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (for example, control channels, data channels, information channels related to multiple energy harvesting BWPs). In some examples, the transmitter 715 may be co-located with a receiver 710 in a transceiver component. The transmitter 715 may utilize a single antenna or a set of multiple antennas.

The device 705, or various components thereof, may be an example of means for performing various aspects of multiple energy harvesting BWPs. For example, the communications manager 720 may include a signaling component 725, an information component 730, an energy component 735, a charging component 740, or any combination thereof. In some examples, the communications manager 720, or various components thereof, may be configured to perform various operations (for example, receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations.

The communications manager 720 may support wireless communication at the device 705 (for example, a UE) in accordance with examples as disclosed herein. The signaling component 725 may be configured as or otherwise support a means for receiving control signaling indicating a configuration for a set of BWPs that includes a first subset of BWPs for wireless communication and a second subset of BWPs for energy harvesting. The information component 730 may be configured as or otherwise support a means for receiving a wireless communication over the first subset of BWPs based on the configuration. The energy component 735 may be configured as or otherwise support a means for receiving a wireless signal for the energy harvesting over the second subset of BWPs based on the configuration. The charging component 740 may be configured as or otherwise support a means for charging a power source associated with the device 705 based on the received wireless signal for the energy harvesting.

Additionally or alternatively, the signaling component 725 may be configured as or otherwise support a means for transmitting, to another UE, control signaling indicating a configuration for a set of BWPs that includes a first subset of BWPs for wireless communication and a second subset of BWPs for energy harvesting. The information component 730 may be configured as or otherwise support a means for transmitting, to the other UE, a wireless communication over the first subset of BWPs based at least in part on the configuration. The energy component 735 may be configured as or otherwise support a means for transmitting, to the other UE, a wireless signal for the energy harvesting over the second subset of BWPs based at least in part on the configuration.

Figure 8:
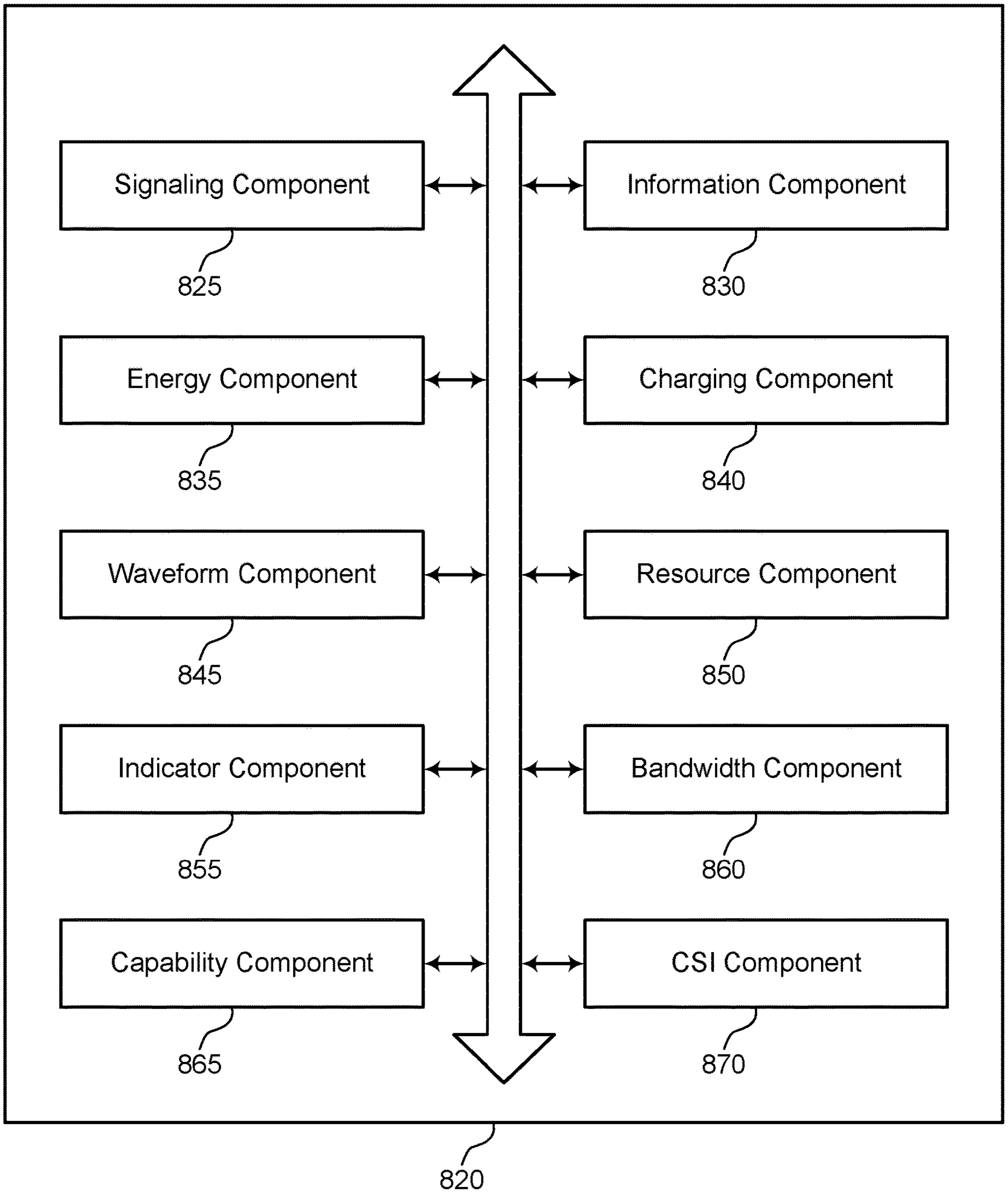
FIG. 8 shows a block diagram of a communications manager that supports harvesting energy from radio frequency communications transmitted between various devices in accordance with aspects of the present disclosure.

FIG. 8 shows a block diagram of a communications manager 820 that supports harvesting energy from radio frequency communications transmitted between various devices in accordance with aspects of the present disclosure. The communications manager 820, or various components thereof, may be an example of means for performing various aspects of multiple energy harvesting BWPs. For example, the communications manager 820 may include a signaling component 825, an information component 830, an energy component 835, a charging component 840, a waveform component 845, a resource component 850, an indicator component 855, a bandwidth component 860, a capability component 865, a CSI component 870, or any combination thereof. Each of these components may communicate, directly or indirectly, with one another (for example, via one or more buses).

The communications manager 820 may support wireless communication at a UE in accordance with examples as disclosed herein. The signaling component 825 may be configured as or otherwise support a means for receiving control signaling indicating a configuration for a set of BWPs that includes a first subset of BWPs for wireless communication and a second subset of BWPs for energy harvesting. The information component 830 may be configured as or otherwise support a means for receiving a wireless communication over the first subset of BWPs based on the configuration. The energy component 835 may be configured as or otherwise support a means for receiving a wireless signal for the energy harvesting over the second subset of BWPs based on the configuration. The charging component 840 may be configured as or otherwise support a means for charging a power source associated with the UE based on the received wireless signal for the energy harvesting.

Additionally or alternatively, the signaling component 825 may be configured as or otherwise support a means for transmitting, to another UE, control signaling indicating a configuration for a set of BWPs that includes a first subset of BWPs for wireless communication and a second subset of BWPs for energy harvesting. The information component 830 may be configured as or otherwise support a means for transmitting, to the other UE, a wireless communication over the first subset of BWPs based at least in part on the configuration. The energy component 835 may be configured as or otherwise support a means for transmitting, to the other UE, a wireless signal for the energy harvesting over the second subset of BWPs based at least in part on the configuration.

In some examples, the energy component 835 may be configured as or otherwise support a means for determining an energy rate for the energy harvesting over the second subset of BWPs based on the configuration. In some examples, the energy component 835 may be configured as or otherwise support a means for receiving the wireless signal for the energy harvesting further based on the energy rate. In some examples, the waveform component 845 may be configured as or otherwise support a means for determining a waveform associated with the wireless signal for the energy harvesting based on the configuration. In some examples, the energy component 835 may be configured as or otherwise support a means for receiving the wireless signal for the energy harvesting further based on the waveform.

In some examples, the resource component 850 may be configured as or otherwise support a means for determining a set of resource patterns associated with the second subset of BWPs based on the configuration. In some examples, the resource component 850 may be configured as or otherwise support a means for determining a set of resources associated with at least one resource pattern of the set of resource patterns based on the configuration. In some examples, the energy component 835 may be configured as or otherwise support a means for receiving the wireless signal for the energy harvesting further based on the set of resources. In some examples, the at least one resource pattern of the set of resource patterns includes a TDD slot pattern. In some examples, a quantity of downlink slots associated with the TDD slot pattern is less than a quantity of uplink slots or flexible slots associated with the TDD slot pattern.

In some examples, the resource component 850 may be configured as or otherwise support a means for selecting a resource pattern of the set of resource patterns for each of one or more BWPs of the second subset of BWPs based on the configuration. In some examples, the indicator component 855 may be configured as or otherwise support a means for transmitting, to a base station, an indication of the selected resource pattern. In some examples, the energy component 835 may be configured as or otherwise support a means for receiving the wireless signal for the energy harvesting further based on the indication.

In some examples, the indicator component 855 may be configured as or otherwise support a means for receiving an indication to monitor one or more BWPs of the second subset of BWPs. In some examples, the energy component 835 may be configured as or otherwise support a means for receiving second wireless communication over the one or more BWPs of the second subset of BWPs. In some examples, to support receiving the indication, the indicator component 855 may be configured as or otherwise support a means for receiving the indication over at least one BWP of the first subset of BWPs.

In some examples, to support receiving the control signaling indicating the configuration, the signaling component 825 may be configured as or otherwise support a means for receiving the control signaling indicating the configuration over at least one BWP of the first subset of BWPs, the configuration including a set of parameters associated with the second subset of BWPs. In some examples, to support receiving the control signaling indicating the configuration, the energy component 835 may be configured as or otherwise support a means for receiving the wireless signal for the energy harvesting further based on the set of parameters. In some examples, the set of parameters includes one or more of an energy rate associated with the second subset of BWPs, a resource pattern associated with the second subset of BWPs, or a waveform type for the wireless signal for the energy harvesting associated with the second subset of BWPs.

In some examples, the indicator component 855 may be configured as or otherwise support a means for transmitting an indication of one or more BWPs of the second subset of BWPs for the energy harvesting based on the configuration. In some examples, the energy component 835 may be configured as or otherwise support a means for receiving the wireless signal for the energy harvesting further based on the indication. In some examples, the CSI component 870 may be configured as or otherwise support a means for determining CSI for a respective BWP of the second subset of BWPs based on at least one respective channel measurement of the respective BWP of the second subset of BWPs. In some examples, the bandwidth component 860 may be configured as or otherwise support a means for selecting the one or more BWPs of the second subset of BWPs for the energy harvesting based on the CSI. In some examples, the energy component 835 may be configured as or otherwise support a means for receiving the wireless signal for the energy harvesting further based on the one or more BWPs.

In some examples, the energy component 835 may be configured as or otherwise support a means for determining an energy rate associated with each BWP of the second subset of BWPs based on the configuration. In some examples, the bandwidth component 860 may be configured as or otherwise support a means for selecting the one or more BWPs of the second subset of BWPs for the energy harvesting based on the energy rate. In some examples, the energy component 835 may be configured as or otherwise support a means for receiving the wireless signal for the energy harvesting further based on the one or more BWPs. In some examples, the bandwidth component 860 may be configured as or otherwise support a means for identifying one or more BWPs of the second subset of BWPs based on an association between the one or more BWPs of the second subset of BWPs and one or more BWPs of the first subset of BWPs. In some examples, the energy component 835 may be configured as or otherwise support a means for receiving the wireless signal for the energy harvesting further based on the association.

In some examples, the one or more BWPs of the first subset of BWPs and the one or more BWPs of the second subset of BWPs correspond to a same component carrier. In some examples, the one or more BWPs of the first subset of BWPs correspond to a first component carrier and the one or more BWPs of the second subset of BWPs correspond to a second component carrier. In some examples, the bandwidth component 860 may be configured as or otherwise support a means for determining an association between a first BWP of the first subset of BWPs and a second BWP of the second subset of BWPs based on the configuration. In some examples, the energy component 835 may be configured as or otherwise support a means for receiving the wireless signal for the energy harvesting further based on the association.

In some examples, the first BWP of the first subset of BWPs overlaps the second BWP of the second subset of BWPs in frequency. In some examples, each BWP of the first subset of BWPs is associated with a respective BWP of the second subset of BWPs. In some examples, two or more BWPs of the first subset of BWPs are associated with a single respective BWP of the second subset of BWPs. In some examples, a BWP of the first subset of BWPs is associated with two or more BWPs of the second subset of BWPs. In some examples, the capability component 865 may be configured as or otherwise support a means for transmitting UE capability information indicating a threshold quantity of BWPs for the energy harvesting. In some examples, the signaling component 825 may be configured as or otherwise support a means for receiving the control signaling indicating the configuration further based on the UE capability information.

Figure 9:
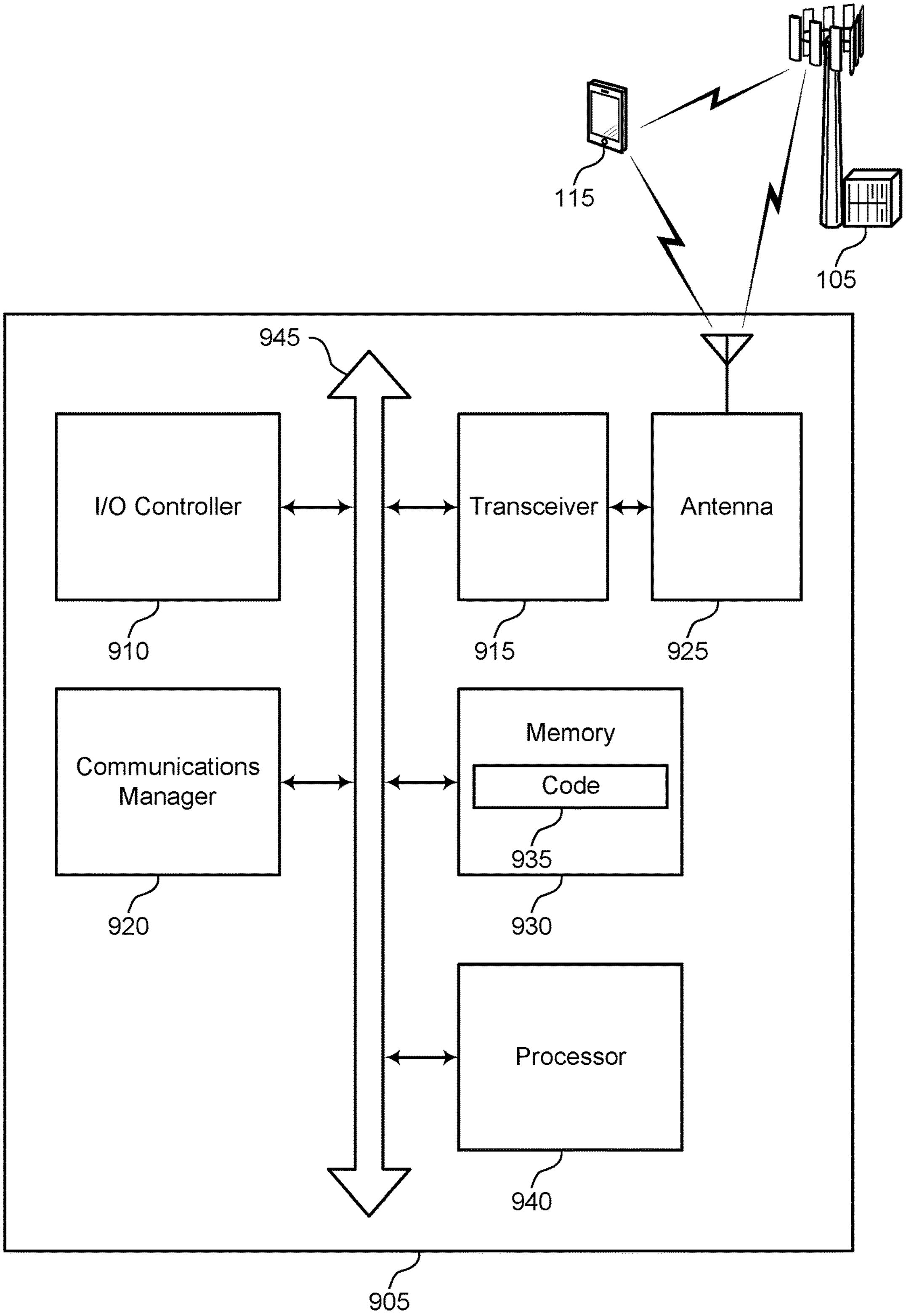
FIG. 9 shows a diagram of a system including a device that supports harvesting energy from radio frequency communications transmitted between various devices in accordance with aspects of the present disclosure.

FIG. 9 shows a diagram of a system including a device 905 that supports harvesting energy from radio frequency communications transmitted between various devices in accordance with aspects of the present disclosure. The device 905 may be an example of or include the components of a device 605, a device 705, or a UE 115. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (for example, operatively, communicatively, functionally, electronically, electrically) via one or more buses (for example, a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (for example, when compiled and executed) to perform functions described herein. In some cases, the memory 930 may contain, among other things, a basic I/O system (BIOS), which may control basic hardware or software operation such as the interaction with peripheral components or devices.

The processor 940 may include an intelligent hardware device (for example, a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (for example, the memory 930) to cause the device 905 to perform various functions (for example, functions or tasks supporting multiple energy harvesting BWPs). For example, the device 905 or a component of the device 905 may include a processor 940 and memory 930 coupled to the processor 940, the processor 940 and memory 930 configured to perform various functions described herein.

The communications manager 920 may support wireless communication at the device 905 (for example, a UE) in accordance with examples as disclosed herein. For example, the communications manager 920 may be configured as or otherwise support a means for receiving control signaling indicating a configuration for a set of BWPs that includes a first subset of BWPs for wireless communication and a second subset of BWPs for energy harvesting. The communications manager 920 may be configured as or otherwise support a means for receiving a wireless communication over the first subset of BWPs based on the configuration. The communications manager 920 may be configured as or otherwise support a means for receiving a wireless signal for the energy harvesting over the second subset of BWPs based on the configuration. The communications manager 920 may be configured as or otherwise support a means for charging a power source associated with the device 905 based on the received wireless signal for the energy harvesting.

By including or configuring the communications manager 920 to support techniques for multiple energy harvesting BWPs, the device 905 may increase a battery life of the device 905 by harvesting energy over one or multiple energy harvesting BWPs.

Additionally or alternatively, the communications manager 920 may be configured as or otherwise support a means for transmitting, to another UE, control signaling indicating a configuration for a set of BWPs that includes a first subset of BWPs for wireless communication and a second subset of BWPs for energy harvesting. The communications manager 920 may be configured as or otherwise support a means for transmitting, to the other UE, a wireless communication over the first subset of BWPs based at least in part on the configuration. The communications manager 920 may be configured as or otherwise support a means for transmitting, to the other UE, a wireless signal for the energy harvesting over the second subset of BWPs based at least in part on the configuration.

In some examples, the communications manager 920 may be configured to perform various operations (for example, receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of multiple energy harvesting BWPs, or the processor 940 and the memory 930 may be otherwise configured to perform or support such operations.

Figure 10:
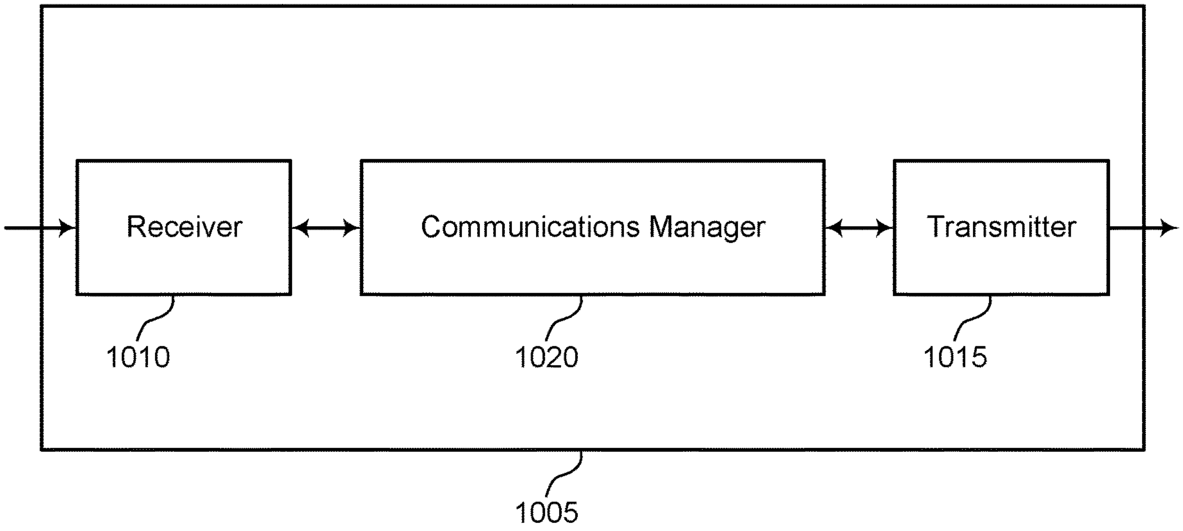
FIGS. 10 and 11 show block diagrams of devices that support harvesting energy from radio frequency communications transmitted between various devices in accordance with aspects of the present disclosure.

FIG. 10 shows a block diagram of a device 1005 that supports harvesting energy from radio frequency communications transmitted between various devices in accordance with aspects of the present disclosure. The device 1005 may be an example of aspects of a base station 105 or a UE 115. The device 1005 may include a receiver 1010, a transmitter 1015, and a communications manager 1020. The communications manager 1020 can be implemented, at least in part, by one or both of a modem and a processor. Each of these components may be in communication with one another (for example, via one or more buses).

The receiver 1010 may provide a means for receiving information such as packets, user data, control information, or any combination thereof associated with various information channels (for example, control channels, data channels, information channels related to multiple energy harvesting BWPs). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (for example, control channels, data channels, information channels related to multiple energy harvesting BWPs). In some examples, the transmitter 1015 may be co-located with a receiver 1010 in a transceiver component. The transmitter 1015 may utilize a single antenna or a set of multiple antennas.

The communications manager 1020, the receiver 1010, the transmitter 1015, or various combinations thereof or various components thereof may be examples of means for performing various aspects of multiple energy harvesting BWPs. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (for example, in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (for example, by executing, by the processor, instructions stored in the memory).

Additionally or alternatively, in some examples, the communications manager 1020, the receiver 1010, the transmitter 1015, or various combinations or components thereof may be implemented in code (for example, as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (for example, configured as or otherwise supporting a means for performing the functions described in the present disclosure).

In some examples, the communications manager 1020 may be configured to perform various operations (for example, receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations.

The communications manager 1020 may support wireless communication at the device 1005 (for example, a base station) in accordance with examples as disclosed herein. For example, the communications manager 1020 may be configured as or otherwise support a means for transmitting, to a UE, control signaling indicating a configuration for a set of BWPs that includes a first subset of BWPs for wireless communication and a second subset of BWPs for energy harvesting. The communications manager 1020 may be configured as or otherwise support a means for transmitting, to the UE, a wireless communication over the first subset of BWPs based on the configuration. The communications manager 1020 may be configured as or otherwise support a means for transmitting, to the UE, a wireless signal for the energy harvesting over the second subset of BWPs based on the configuration.

By including or configuring the communications manager 1020 to support techniques for multiple energy harvesting BWPs, the device 1005 (for example, a processor controlling or otherwise coupled to the receiver 1010, the transmitter 1015, the communications manager 1020, or a combination thereof) may experience a high power yield and increased battery life by harvesting energy via one or multiple wireless signal transmissions over one or multiple energy harvesting BWPs.

Additionally or alternatively, the communications manager 1020 may be configured as or otherwise support a means for transmitting, to a UE, control signaling indicating a configuration for a set of BWPs that includes a first subset of BWPs for wireless communication and a second subset of BWPs for energy harvesting. The communications manager 1020 may be configured as or otherwise support a means for transmitting, to the UE, a wireless communication over the first subset of BWPs based at least in part on the configuration. The communications manager 1020 may be configured as or otherwise support a means for transmitting, to the UE, a wireless signal for the energy harvesting over the second subset of BWPs based at least in part on the configuration.

Figure 11:
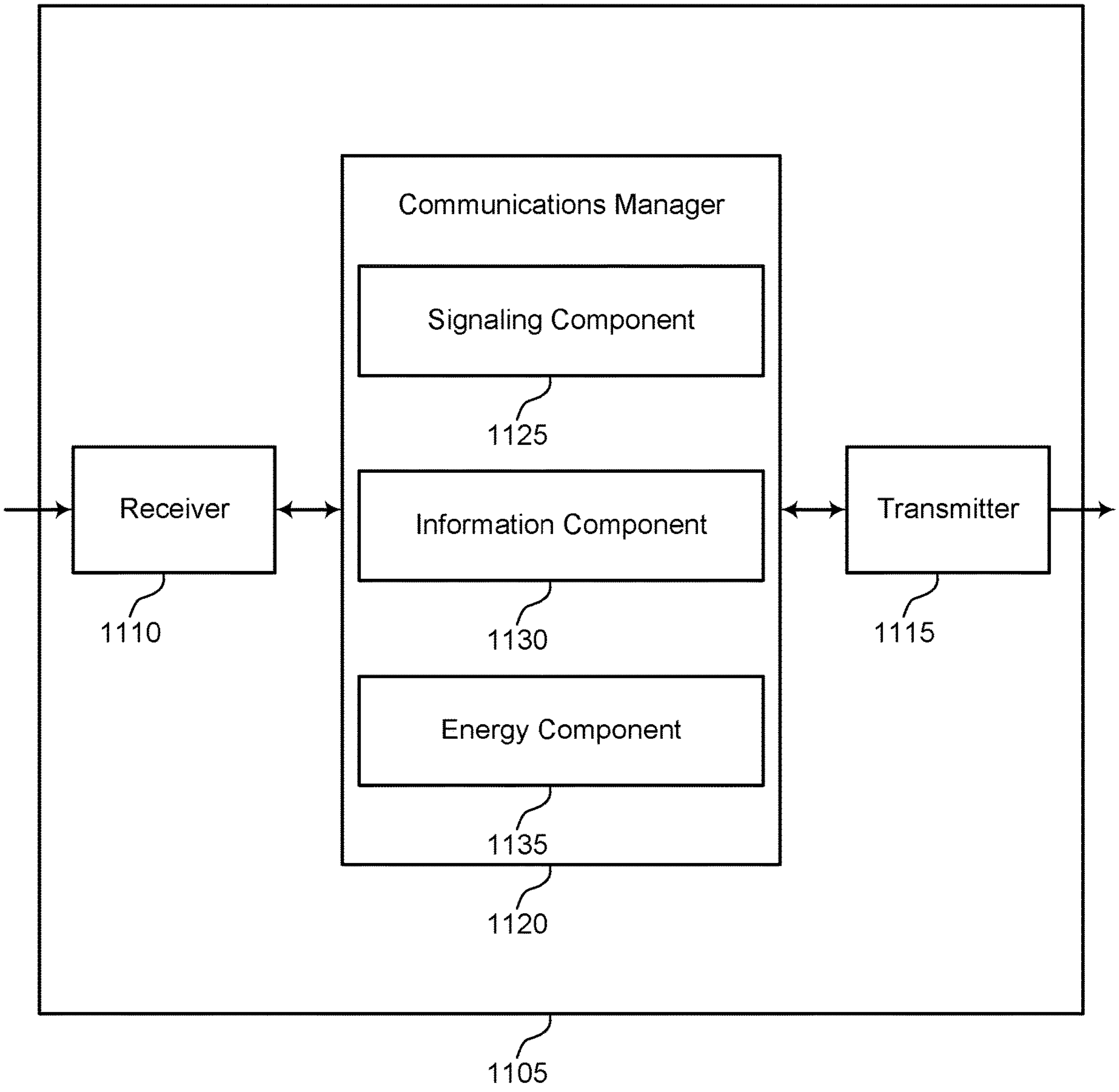

FIG. 11 shows a block diagram of a device 1105 that supports harvesting energy from radio frequency communications transmitted between various devices in accordance with aspects of the present disclosure. The device 1105 may be an example of aspects of a device 1005 or a base station 105 or a UE 115. The device 1105 may include a receiver 1110, a transmitter 1115, and a communications manager 1120. The communications manager 1120 can be implemented, at least in part, by one or both of a modem and a processor. Each of these components may be in communication with one another (for example, via one or more buses).

The receiver 1110 may provide a means for receiving information such as packets, user data, control information, or any combination thereof associated with various information channels (for example, control channels, data channels, information channels related to multiple energy harvesting BWPs). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (for example, control channels, data channels, information channels related to multiple energy harvesting BWPs). In some examples, the transmitter 1115 may be co-located with a receiver 1110 in a transceiver component. The transmitter 1115 may utilize a single antenna or a set of multiple antennas.

The device 1105, or various components thereof, may be an example of means for performing various aspects of multiple energy harvesting BWPs. For example, the communications manager 1120 may include a signaling component 1125, an information component 1130, an energy component 1135, or any combination thereof. In some examples, the communications manager 1120, or various components thereof, may be configured to perform various operations (for example, receiving, monitoring, transmitting) using or otherwise in cooperation with the receiver

1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations.

The communications manager 1120 may support wireless communication at the device 1105 (for example, a base station) in accordance with examples as disclosed herein. The signaling component 1125 may be configured as or otherwise support a means for transmitting, to a UE, control signaling indicating a configuration for a set of BWPs that includes a first subset of BWPs for wireless communication and a second subset of BWPs for energy harvesting. The information component 1130 may be configured as or otherwise support a means for transmitting, to the UE, a wireless communication over the first subset of BWPs based on the configuration. The energy component 1135 may be configured as or otherwise support a means for transmitting, to the UE, a wireless signal for the energy harvesting over the second subset of BWPs based on the configuration.

Additionally or alternatively, the signaling component 1125 may be configured as or otherwise support a means for transmitting, to a UE, control signaling indicating a configuration for a set of BWPs that includes a first subset of BWPs for wireless communication and a second subset of BWPs for energy harvesting. The information component 1130 may be configured as or otherwise support a means for transmitting, to the UE, a wireless communication over the first subset of BWPs based at least in part on the configuration. The energy component 1135 may be configured as or otherwise support a means for transmitting, to the UE, a wireless signal for the energy harvesting over the second subset of BWPs based at least in part on the configuration.

Figure 12:
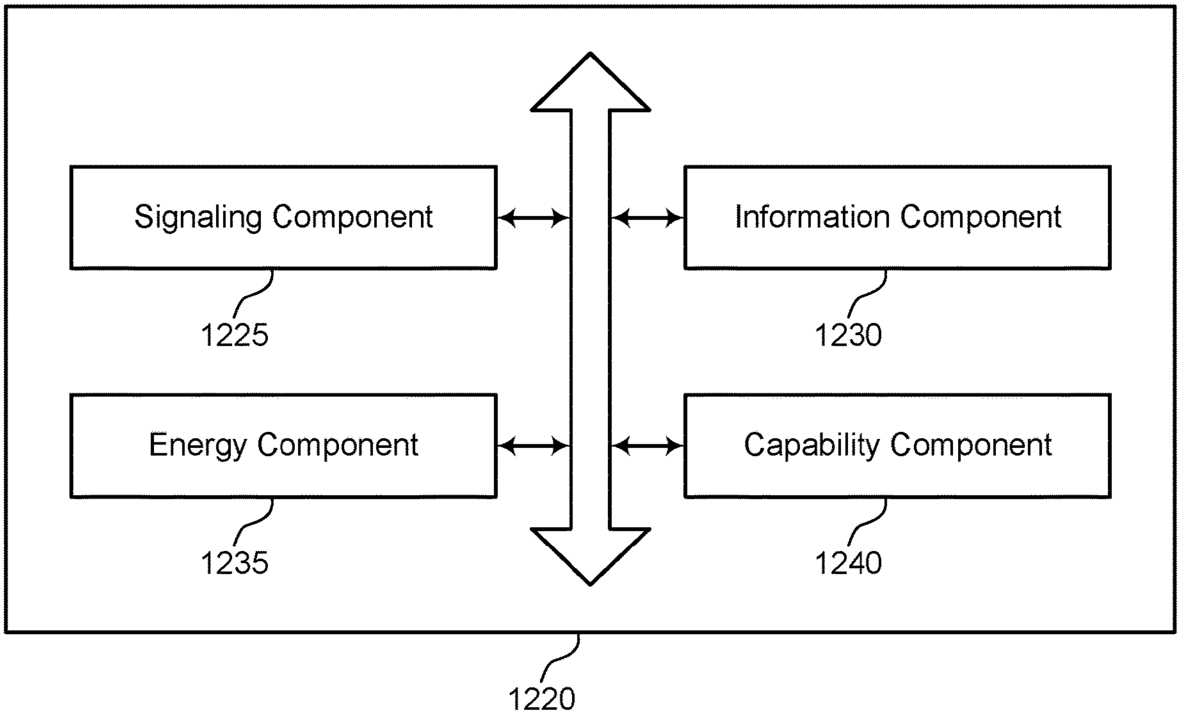
FIG. 12 shows a block diagram of a communications manager that supports harvesting energy from radio frequency communications transmitted between various devices in accordance with aspects of the present disclosure.

FIG. 12 shows a block diagram of a communications manager 1220 that supports harvesting energy from radio frequency communications transmitted between various devices in accordance with aspects of the present disclosure. The communications manager 1220, or various components thereof, may be an example of means for performing various aspects of multiple energy harvesting BWPs. For example, the communications manager 1220 may include a signaling component 1225, an information component 1230, an energy component 1235, a capability component 1240, or any combination thereof. Each of these components may communicate, directly or indirectly, with one another (for example, via one or more buses).

The communications manager 1220 may support wireless communication at a base station in accordance with examples as disclosed herein. The signaling component 1225 may be configured as or otherwise support a means for transmitting, to a UE, control signaling indicating a configuration for a set of BWPs that includes a first subset of BWPs for wireless communication and a second subset of BWPs for energy harvesting. The information component 1230 may be configured as or otherwise support a means for transmitting, to the UE, a wireless communication over the first subset of BWPs based on the configuration. The energy component 1235 may be configured as or otherwise support a means for transmitting, to the UE, a wireless signal for the energy harvesting over the second subset of BWPs based on the configuration.

Additionally or alternatively, the signaling component 1225 may be configured as or otherwise support a means for transmitting, to a UE, control signaling indicating a configuration for a set of BWPs that includes a first subset of BWPs for wireless communication and a second subset of BWPs for energy harvesting. The information component 1230 may be configured as or otherwise support a means for transmitting, to the UE, a wireless communication over the first subset of BWPs based at least in part on the configuration. The energy component 1235 may be configured as or otherwise support a means for transmitting, to the UE, a wireless signal for the energy harvesting over the second subset of BWPs based at least in part on the configuration.

In some examples, the capability component 1240 may be configured as or otherwise support a means for receiving UE capability information indicating a threshold quantity of BWPs for the energy harvesting. In some examples, the energy component 1235 may be configured as or otherwise support a means for transmitting the wireless signal for the energy harvesting further based on the UE capability information. In some examples, the configuration further includes one or more parameters associated with the second subset of BWPs, the one or more parameters including one or more of an energy rate associated with the second subset of BWPs, a resource pattern associated with the second subset of BWPs, or a waveform for the wireless signal for the energy harvesting associated with the second subset of BWPs. In some examples, each BWP of the first subset of BWPs is associated with a respective BWP of the second subset of BWPs. In some examples, two or more BWPs of the first subset of BWPs are associated with a single respective BWP of the second subset of BWPs.

Figure 13:
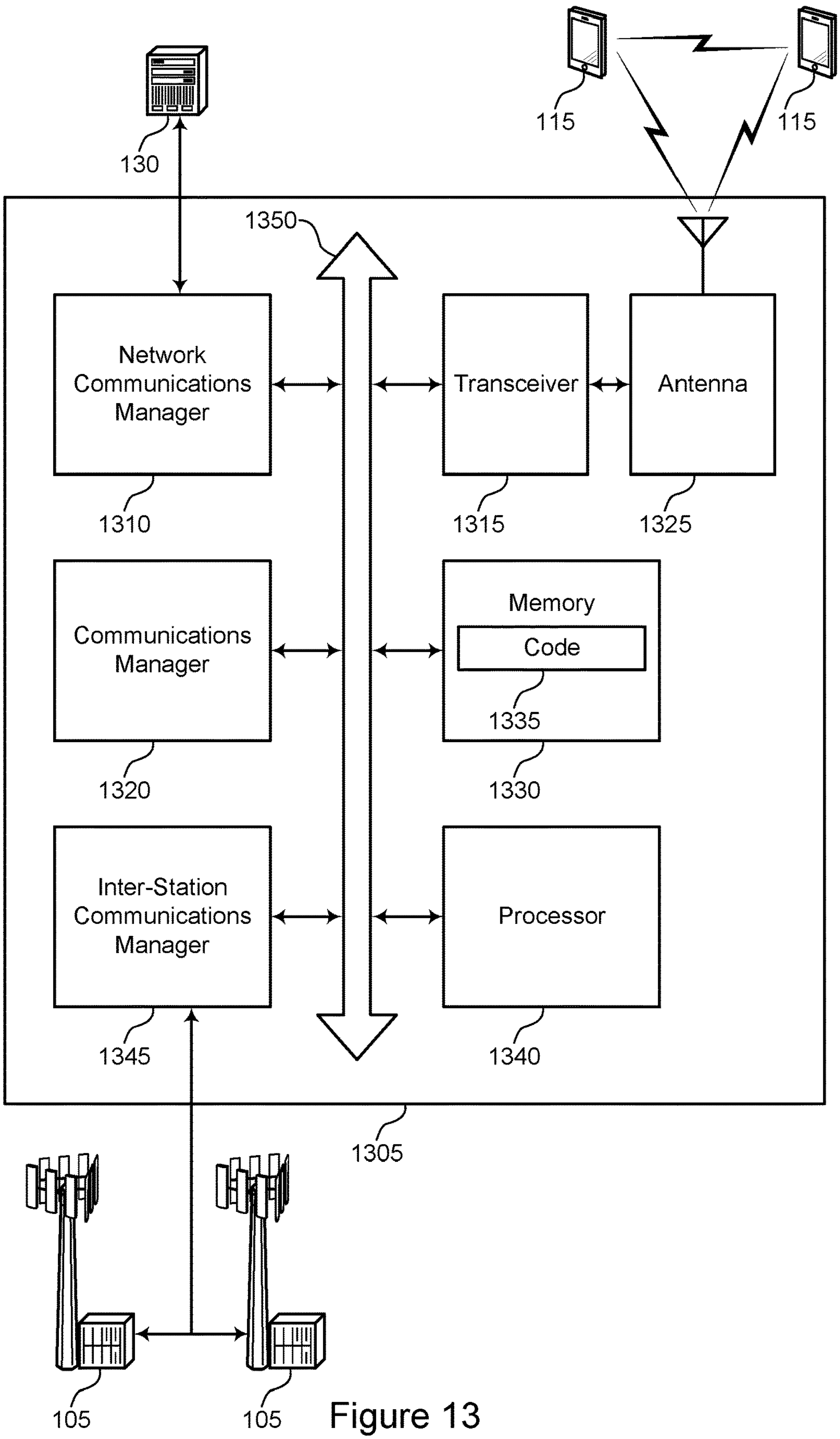
FIG. 13 shows a diagram of a system including a device that supports harvesting energy from radio frequency communications transmitted between various devices in accordance with aspects of the present disclosure.

FIG. 13 shows a diagram of a system including a device 1305 that supports harvesting energy from radio frequency communications transmitted between various devices in accordance with aspects of the present disclosure. The device 1305 may be an example of or include the components of a device 1005, a device 1105, or a base station 105. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (for example, operatively, communicatively, functionally, electronically, electrically) via one or more buses (for example, a bus 1350).

The network communications manager 1310 may manage communications with a core network 130 (for example, via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (for example, when compiled and executed) to perform functions described herein. In some cases, the memory 1330 may contain, among other things, a BIOS that may control basic hardware or software operation such as the interaction with peripheral components or devices.

The processor 1340 may include an intelligent hardware device (for example, a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (for example, the memory 1330) to cause the device 1305 to perform various functions (for example, functions or tasks supporting multiple energy harvesting BWPs). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communication at the device 1305 (for example, a base station) in accordance with examples as disclosed herein. For example, the communications manager 1320 may be configured as or otherwise support a means for transmitting, to a UE, control signaling indicating a configuration for a set of BWPs that includes a first subset of BWPs for wireless communication and a second subset of BWPs for energy harvesting. The communications manager 1320 may be configured as or otherwise support a means for transmitting, to the UE, a wireless communication over the first subset of BWPs based on the configuration. The communications manager 1320 may be configured as or otherwise support a means for transmitting, to the UE, a wireless signal for the energy harvesting over the second subset of BWPs based on the configuration.

Additionally or alternatively, the communications manager 1320 may be configured as or otherwise support a means for transmitting, to a UE, control signaling indicating a configuration for a set of BWPs that includes a first subset of BWPs for wireless communication and a second subset of BWPs for energy harvesting. The communications manager 1320 may be configured as or otherwise support a means for transmitting, to the UE, a wireless communication over the first subset of BWPs based at least in part on the configuration. The communications manager 1320 may be configured as or otherwise support a means for transmitting, to the UE, a wireless signal for the energy harvesting over the second subset of BWPs based at least in part on the configuration.

In some examples, the communications manager 1320 may be configured to perform various operations (for example, receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of multiple energy harvesting BWPs, or the processor 1340 and the memory 1330 may be otherwise configured to perform or support such operations.

Figure 14:
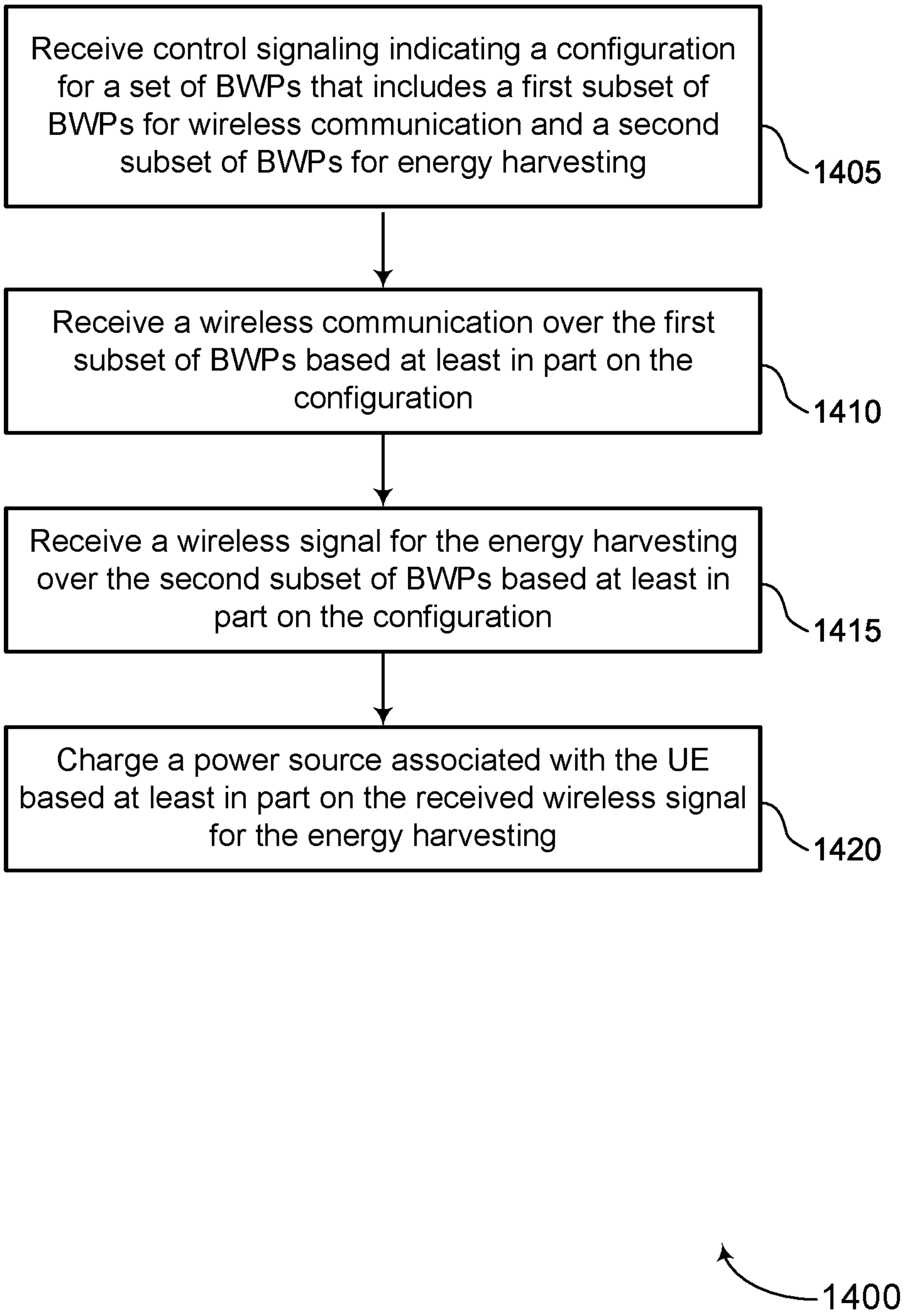
FIGS. 14-18 show flowcharts illustrating methods that support harvesting energy from radio frequency communications transmitted between various devices in accordance with aspects of the present disclosure.

FIG. 14 shows a flowchart illustrating a method 1400 that supports harvesting energy from radio frequency communications transmitted between various devices in accordance with aspects of the present disclosure. The operations of the method 1400 may be implemented by a UE or its components. For example, the operations of the method 1400 may be performed by a UE 115 as described with reference to FIGS. 1-9. In some examples, a UE may execute a set of instructions to control the functional elements of the UE to perform the described functions. Additionally, or alternatively, a UE may perform aspects of the described functions using special-purpose hardware.

At 1405, the method may include receiving control signaling indicating a configuration for a set of BWPs that includes a first subset of BWPs for wireless communication and a second subset of BWPs for energy harvesting. The operations of 1405 may be performed in accordance with examples as disclosed herein. In some examples, aspects of the operations of 1405 may be performed by a signaling component 825 as described with reference to FIG. 8.

At 1410, the method may include receiving a wireless communication over the first subset of BWPs based on the configuration. The operations of 1410 may be performed in accordance with examples as disclosed herein. In some examples, aspects of the operations of 1410 may be performed by an information component 830 as described with reference to FIG. 8.

At 1415, the method may include receiving a wireless signal for the energy harvesting over the second subset of BWPs based on the configuration. The operations of 1415 may be performed in accordance with examples as disclosed herein. In some examples, aspects of the operations of 1415 may be performed by an energy component 835 as described with reference to FIG. 8.

At 1420, the method may include charging a power source associated with the UE based on the received wireless signal for the energy harvesting. The operations of 1420 may be performed in accordance with examples as disclosed herein. In some examples, aspects of the operations of 1420 may be performed by a charging component 840 as described with reference to FIG. 8.

Figure 15:
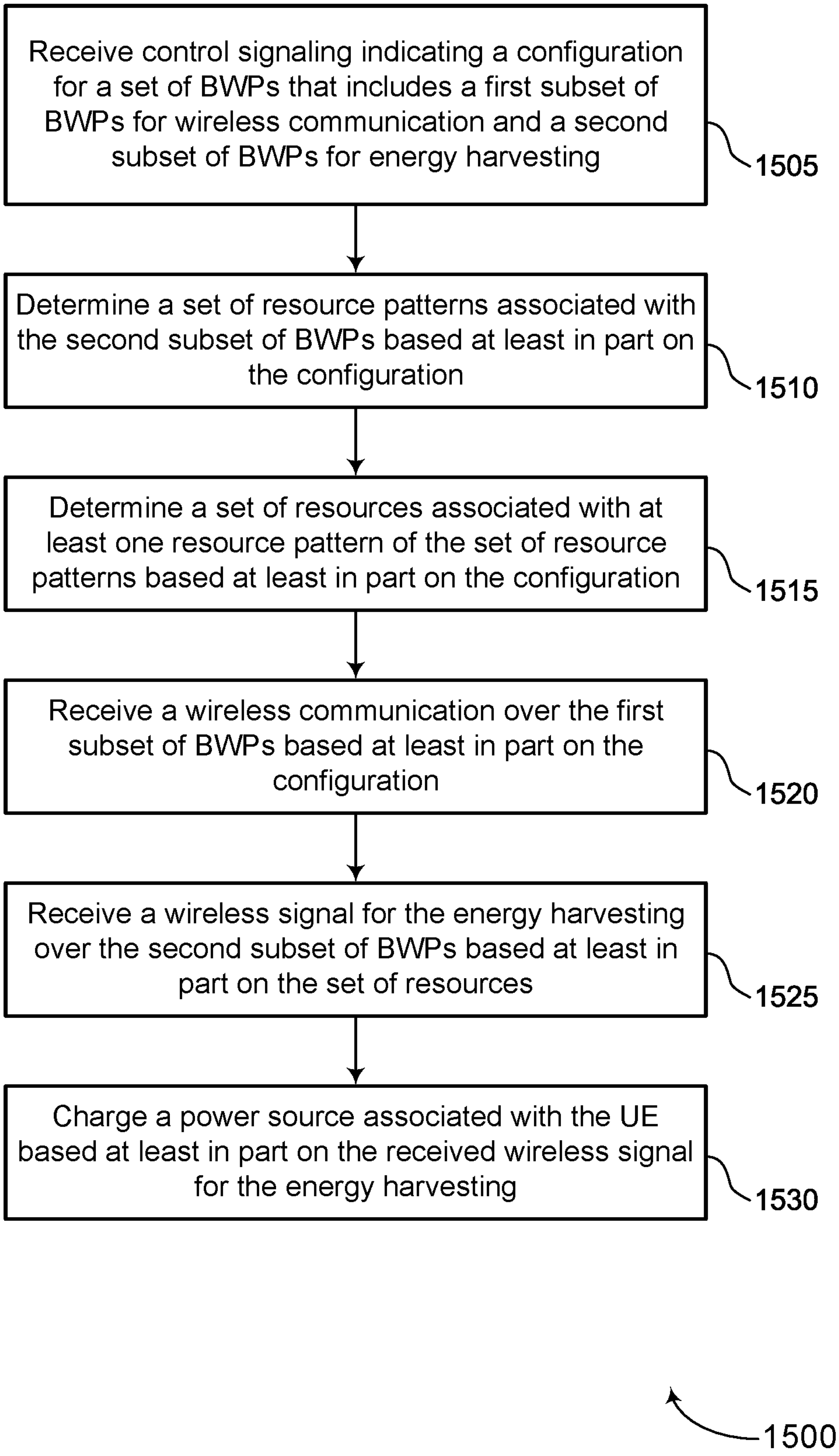

FIG. 15 shows a flowchart illustrating a method 1500 that supports harvesting energy from radio frequency communications transmitted between various devices in accordance with aspects of the present disclosure. The operations of the method 1500 may be implemented by a UE or its components. For example, the operations of the method 1500 may be performed by a UE 115 as described with reference to FIGS. 1-9. In some examples, a UE may execute a set of instructions to control the functional elements of the UE to perform the described functions. Additionally, or alternatively, a UE may perform aspects of the described functions using special-purpose hardware.

At 1505, the method may include receiving control signaling indicating a configuration for a set of BWPs that includes a first subset of BWPs for wireless communication and a second subset of BWPs for energy harvesting. The operations of 1505 may be performed in accordance with examples as disclosed herein. In some examples, aspects of the operations of 1505 may be performed by a signaling component 825 as described with reference to FIG. 8.

At 1510, the method may include determining a set of resource patterns associated with the second subset of BWPs based on the configuration. The operations of 1510 may be performed in accordance with examples as disclosed herein. In some examples, aspects of the operations of 1510 may be performed by a resource component 850 as described with reference to FIG. 8.

At 1515, the method may include determining a set of resources associated with at least one resource pattern of the set of resource patterns based on the configuration. The operations of 1515 may be performed in accordance with examples as disclosed herein. In some examples, aspects of the operations of 1515 may be performed by a resource component 850 as described with reference to FIG. 8.

At 1520, the method may include receiving a wireless communication over the first subset of BWPs based on the configuration. The operations of 1520 may be performed in accordance with examples as disclosed herein. In some examples, aspects of the operations of 1520 may be performed by an information component 830 as described with reference to FIG. 8.

At 1525, the method may include receiving a wireless signal for the energy harvesting over the second subset of BWPs based on the set of resources. The operations of 1525 may be performed in accordance with examples as disclosed herein. In some examples, aspects of the operations of 1525 may be performed by an energy component 835 as described with reference to FIG. 8.

At 1530, the method may include charging a power source associated with the UE based on the received wireless signal for the energy harvesting. The operations of 1530 may be performed in accordance with examples as disclosed herein. In some examples, aspects of the operations of 1530 may be performed by a charging component 840 as described with reference to FIG. 8.

Figure 16:
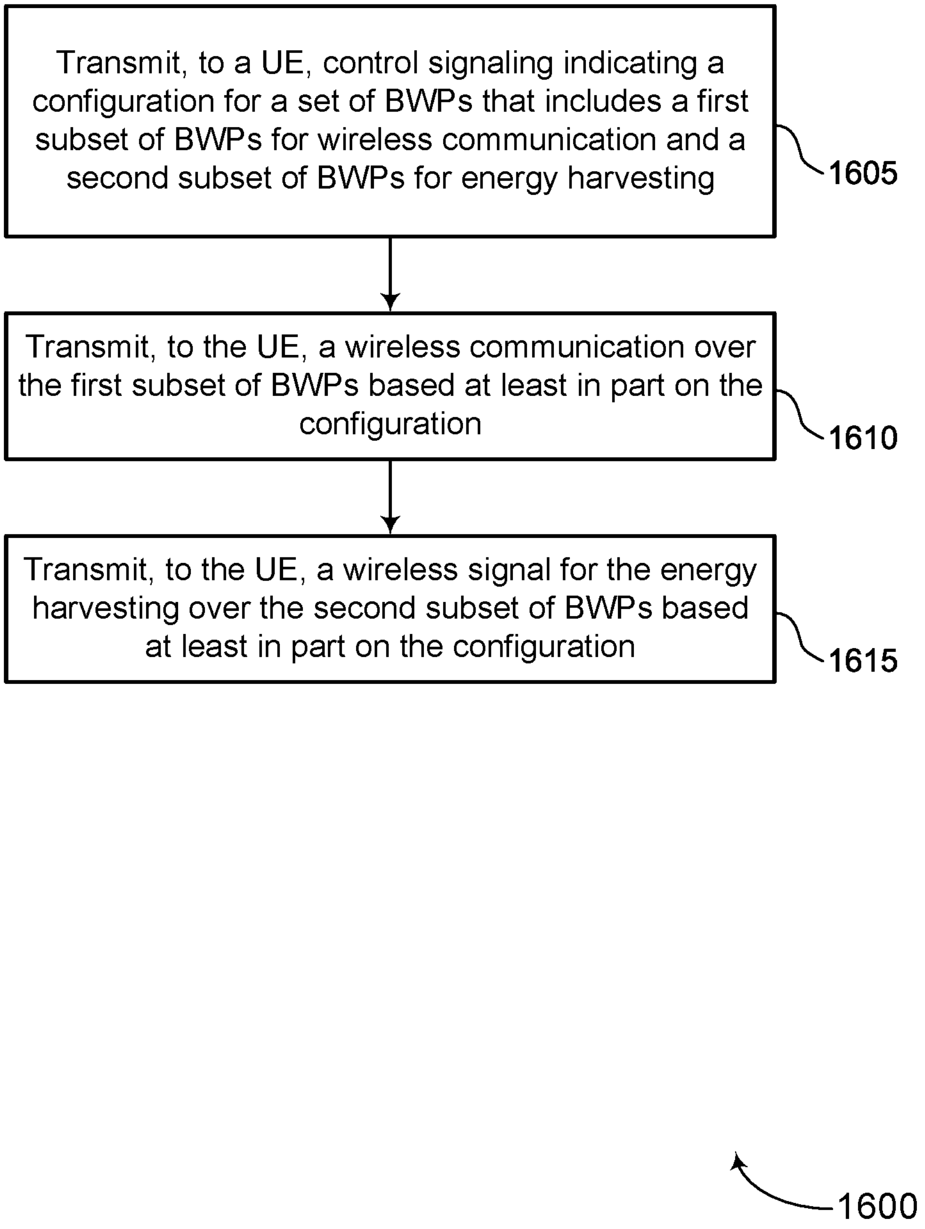

FIG. 16 shows a flowchart illustrating a method 1600 that supports harvesting energy from radio frequency communications transmitted between various devices in accordance with aspects of the present disclosure. The operations of the method 1600 may be implemented by a base station or its components. For example, the operations of the method 1600 may be performed by a base station 105 as described with reference to FIGS. 1-5 and 10-13. In some examples, a base station may execute a set of instructions to control the functional elements of the base station to perform the described functions. Additionally, or alternatively, a base station may perform aspects of the described functions using special-purpose hardware.

At 1605, the method may include transmitting, to a UE, control signaling indicating a configuration for a set of BWPs that includes a first subset of BWPs for wireless communication and a second subset of BWPs for energy harvesting. The operations of 1605 may be performed in accordance with examples as disclosed herein. In some examples, aspects of the operations of 1605 may be performed by a signaling component 1225 as described with reference to FIG. 12.

At 1610, the method may include transmitting, to the UE, a wireless communication over the first subset of BWPs based on the configuration. The operations of 1610 may be performed in accordance with examples as disclosed herein. In some examples, aspects of the operations of 1610 may be performed by an information component 1230 as described with reference to FIG. 12.

At 1615, the method may include transmitting, to the UE, a wireless signal for the energy harvesting over the second subset of BWPs based on the configuration. The operations of 1615 may be performed in accordance with examples as disclosed herein. In some examples, aspects of the operations of 1615 may be performed by an energy component 1235 as described with reference to FIG. 12.

Figure 17:
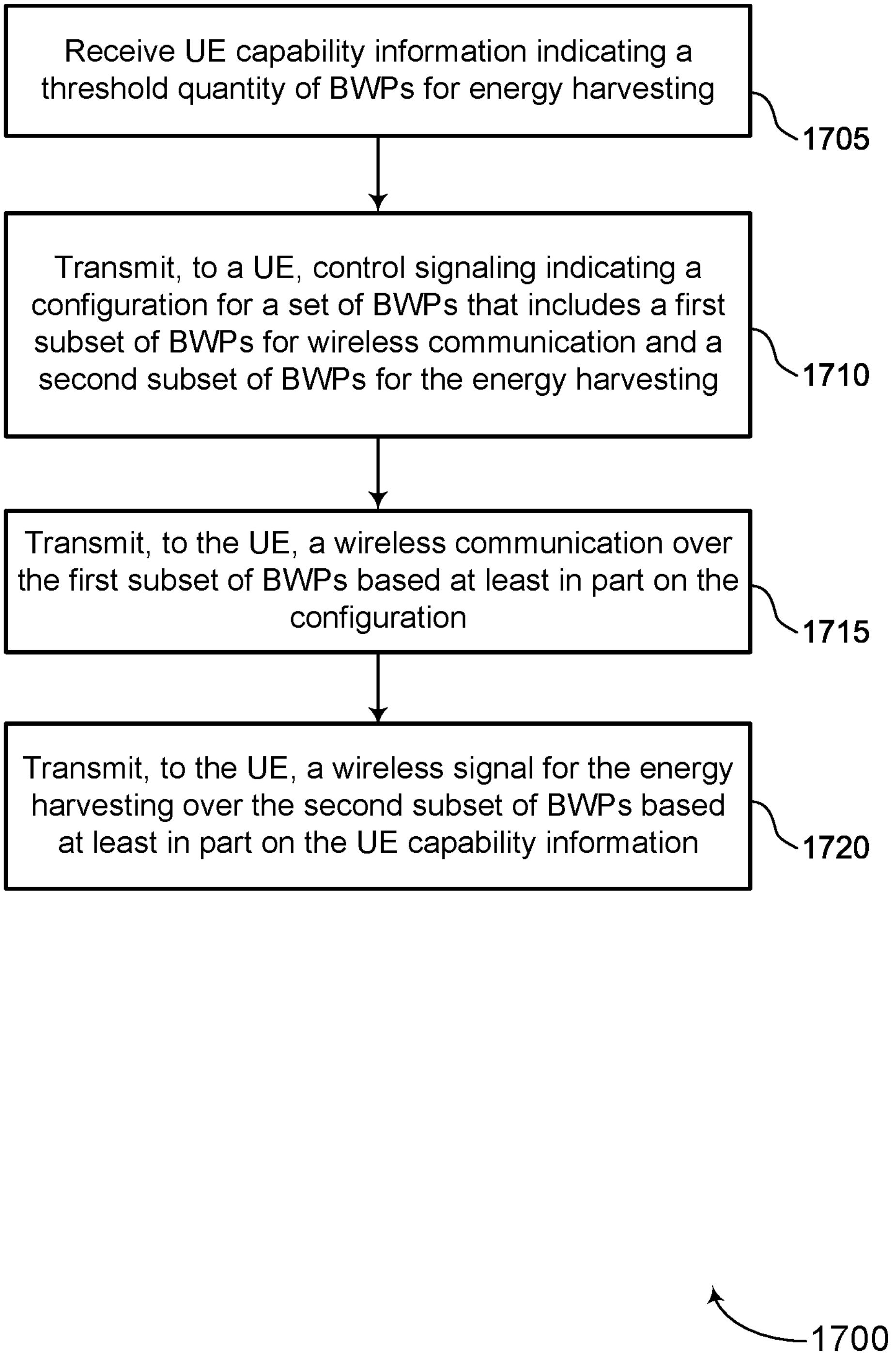

FIG. 17 shows a flowchart illustrating a method 1700 that supports harvesting energy from radio frequency communications transmitted between various devices in accordance with aspects of the present disclosure. The operations of the method 1700 may be implemented by a base station or its components. For example, the operations of the method 1700 may be performed by a base station 105 as described with reference to FIGS. 1-5 and 10-13. In some examples, a base station may execute a set of instructions to control the functional elements of the base station to perform the described functions. Additionally, or alternatively, a base station may perform aspects of the described functions using special-purpose hardware.

At 1705, the method may include receiving UE capability information indicating a threshold quantity of BWPs for energy harvesting. The operations of 1705 may be performed in accordance with examples as disclosed herein. In some examples, aspects of the operations of 1705 may be performed by a capability component 1240 as described with reference to FIG. 12.

At 1710, the method may include transmitting, to a UE, control signaling indicating a configuration for a set of BWPs that includes a first subset of BWPs for wireless communication and a second subset of BWPs for the energy harvesting. The operations of 1710 may be performed in accordance with examples as disclosed herein. In some examples, aspects of the operations of 1710 may be performed by a signaling component 1225 as described with reference to FIG. 12.

At 1715, the method may include transmitting, to the UE, a wireless communication over the first subset of BWPs based on the configuration. The operations of 1715 may be performed in accordance with examples as disclosed herein. In some examples, aspects of the operations of 1715 may be performed by an information component 1230 as described with reference to FIG. 12.

At 1720, the method may include transmitting, to the UE, a wireless signal for the energy harvesting over the second subset of BWPs based on the UE capability information. The operations of 1720 may be performed in accordance with examples as disclosed herein. In some examples, aspects of the operations of 1720 may be performed by an energy component 1235 as described with reference to FIG. 12.

Figure 18:
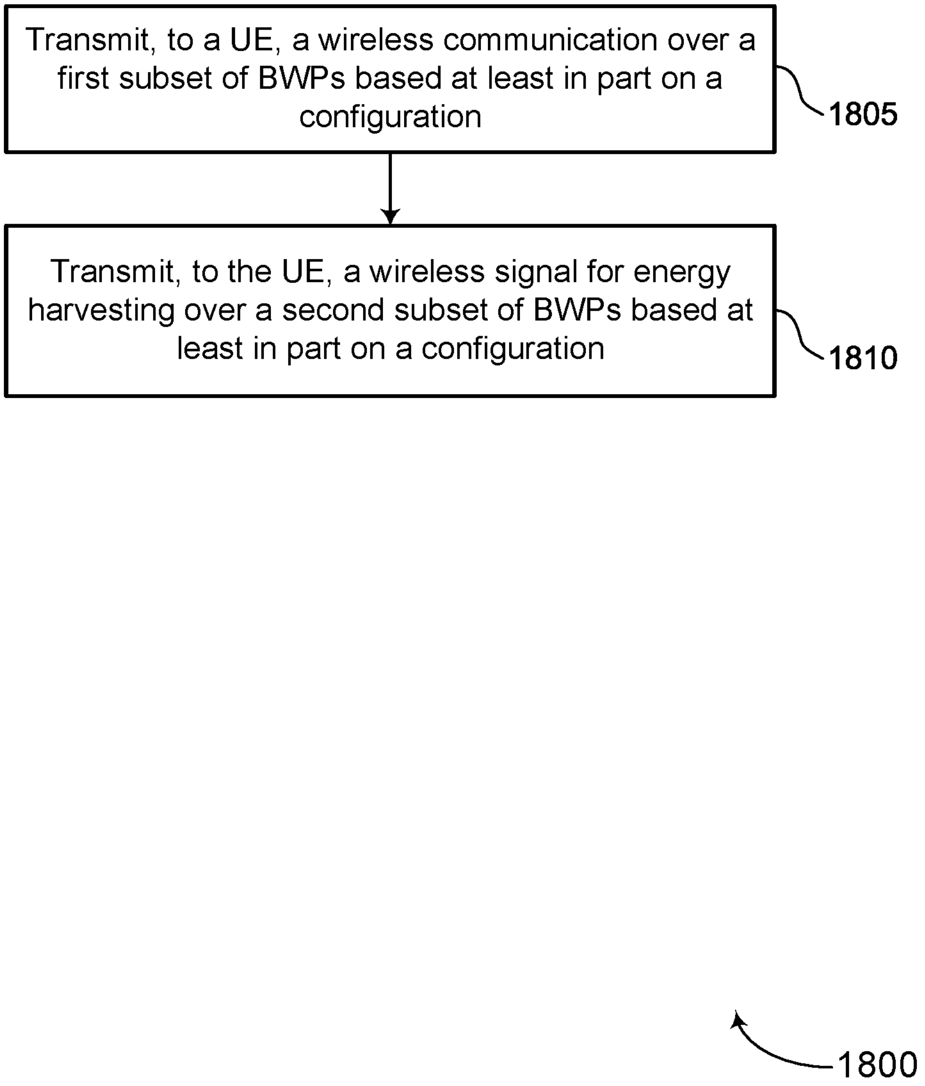

FIG. 18 shows a flowchart illustrating a method 1800 that supports harvesting energy from radio frequency communications transmitted between various devices in accordance with aspects of the present disclosure. The operations of the method 1800 may be implemented by a base station or its components. For example, the operations of the method 1800 may be performed by a base station 105 as described with reference to FIGS. 1-9. In some examples, a UE may execute a set of instructions to control the functional elements of the UE to perform the described functions. Additionally, or alternatively, a UE may perform aspects of the described functions using special-purpose hardware.

At 1805, the method may include transmitting, to a UE, a wireless communication over a first subset of BWPs based at least in part on a configuration. The operations of 1805 may be performed in accordance with examples as disclosed herein. In some examples, aspects of the operations of 1805 may be performed by an information component 830 as described with reference to FIG. 8.

At 1810, the method may include transmitting, to the UE, a wireless signal for energy harvesting over a second subset of BWPs based at least in part on a configuration. The operations of 1810 may be performed in accordance with examples as disclosed herein. In some examples, aspects of the operations of 1810 may be performed by an energy component 835 as described with reference to FIG. 8.

The following provides an overview of aspects of the present disclosure:

Aspect 1: A method for wireless communication at a UE, comprising: receiving control signaling indicating a configuration for a set of BWPs that includes a first subset of BWPs for wireless communication and a second subset of BWPs for energy harvesting; receiving a wireless communication over the first subset of BWPs based at least in part on the configuration; receiving a wireless signal for the energy harvesting over the second subset of BWPs based at least in part on the configuration; and charging a power source associated with the UE based at least in part on the received wireless signal for the energy harvesting.

Aspect 2: The method of aspect 1, further comprising: determining an energy rate for the energy harvesting over the second subset of BWPs based at least in part on the configuration, wherein receiving the wireless signal for the energy harvesting is further based at least in part on the energy rate.

Aspect 3: The method of any of aspects 1 through 2, further comprising: determining a waveform associated with the wireless signal for the energy harvesting based at least in part on the configuration, wherein receiving the wireless signal for the energy harvesting is further based at least in part on the waveform.

Aspect 4: The method of any of aspects 1 through 3, further comprising: determining a set of resource patterns associated with the second subset of BWPs based at least in part on the configuration; and determining a set of resources associated with at least one resource pattern of the set of resource patterns based at least in part on the configuration, wherein receiving the wireless signal for the energy harvesting is further based at least in part on the set of resources.

Aspect 5: The method of aspect 4, wherein the at least one resource pattern of the set of resource patterns comprises a TDD slot pattern.

Aspect 6: The method of aspect 5, wherein a quantity of downlink slots associated with the TDD slot pattern is less than a quantity of uplink slots or flexible slots associated with the TDD slot pattern.

Aspect 7: The method of any of aspects 4 through 6, further comprising: selecting a resource pattern of the set of resource patterns for each of one or more BWPs of the second subset of BWPs based at least in part on the configuration; and transmitting, to a base station, an indication of the selected resource pattern, wherein receiving the wireless signal for the energy harvesting is further based at least in part on the indication.

Aspect 8: The method of any of aspects 1 through 7, further comprising: receiving an indication to monitor one or more BWPs of the second subset of BWPs; and receiving a second wireless communication over the one or more BWPs of the second subset of BWPs.

Aspect 9: The method of aspect 8, wherein receiving the indication comprises: receiving the indication over at least one BWP of the first subset of BWPs.

Aspect 10: The method of any of aspects 1 through 9, wherein receiving the control signaling indicating the configuration comprises: receiving the control signaling indicating the configuration over at least one BWP of the first subset of BWPs, the configuration comprising a set of parameters associated with the second subset of BWPs, wherein receiving the wireless signal for the energy harvesting is further based at least in part on the set of parameters.

Aspect 11: The method of aspect 10, wherein the set of parameters comprises one or more of an energy rate associated with the second subset of BWPs, a resource pattern associated with the second subset of BWPs, or a waveform type for the wireless signal for the energy harvesting associated with the second subset of BWPs.

Aspect 12: The method of any of aspects 1 through 11, further comprising: transmitting an indication of one or more preferred BWPs of the second subset of BWPs for the energy harvesting based at least in part on the configuration, wherein receiving the wireless signal for the energy harvesting is further based at least in part on the indication.

Aspect 13: The method of aspect 12, further comprising: determining channel state information for a respective BWP of the second subset of BWPs based at least in part on at least one respective channel measurement of the respective BWP of the second subset of BWPs; and selecting the one or more preferred BWPs of the second subset of BWPs for the energy harvesting based at least in part on the channel state information, wherein receiving the wireless signal for the energy harvesting is further based at least in part on the one or more preferred BWPs.

Aspect 14: The method of any of aspects 12 through 13, further comprising: determining an energy rate associated with each BWP of the second subset of BWPs based at least in part on the configuration; and selecting the one or more preferred BWPs of the second subset of BWPs for the energy harvesting based at least in part on the energy rate, wherein receiving the wireless signal for the energy harvesting is further based at least in part on the one or more preferred BWPs.

Aspect 15: The method of any of aspects 1 through 14, further comprising: identifying one or more BWPs of the second subset of BWPs based at least in part on an association between the one or more BWPs of the second subset of BWPs and one or more BWPs of the first subset of BWPs, wherein receiving the wireless signal for the energy harvesting is further based at least in part on the association.

Aspect 16: The method of aspect 15, wherein the one or more BWPs of the first subset of BWPs and the one or more BWPs of the second subset of BWPs correspond to a same component carrier.

Aspect 17: The method of any of aspects 15 through 16, wherein the one or more BWPs of the first subset of BWPs correspond to a first component carrier and the one or more BWPs of the second subset of BWPs correspond to a second component carrier.

Aspect 18: The method of any of aspects 1 through 17, further comprising: determining an association between a first BWP of the first subset of BWPs and a second BWP of the second subset of BWPs based at least in part on the configuration, wherein receiving the wireless signal for the energy harvesting is further based at least in part on the association.

Aspect 19: The method of aspect 18, wherein the first BWP of the first subset of BWPs overlaps the second BWP of the second subset of BWPs in frequency.

Aspect 20: The method of any of aspects 1 through 19, wherein each BWP of the first subset of BWPs is associated with a respective BWP of the second subset of BWPs.

Aspect 21: The method of any of aspects 1 through 20, wherein two or more BWPs of the first subset of BWPs are associated with a single respective BWP of the second subset of BWPs.

Aspect 22: The method of any of aspects 1 through 21, wherein a BWP of the first subset of BWPs is associated with two or more BWPs of the second subset of BWPs.

Aspect 23: The method of any of aspects 1 through 22, further comprising: transmitting UE capability information indicating a threshold quantity of BWPs for the energy harvesting, wherein receiving the control signaling indicating the configuration is further based at least in part on the UE capability information.

Aspect 24: A method for wireless communication at a device, comprising: transmitting, to a UE, control signaling indicating a configuration for a set of BWPs that includes a first subset of BWPs for wireless communication and a second subset of BWPs for energy harvesting; transmitting, to the UE, a wireless communication over the first subset of BWPs based at least in part on the configuration; and transmitting, to the UE, a wireless signal for the energy harvesting over the second subset of BWPs based at least in part on the configuration.

Aspect 25: The method of aspect 24, further comprising: receiving UE capability information indicating a threshold quantity of BWPs for the energy harvesting, wherein transmitting the wireless signal for the energy harvesting is further based at least in part on the UE capability information.

Aspect 26: The method of any of aspects 24 through 25, wherein the configuration further comprises one or more parameters associated with the second subset of BWPs, the one or more parameters comprising one or more of an energy rate associated with the second subset of BWPs, a resource pattern associated with the second subset of BWPs, or a waveform for the wireless signal for the energy harvesting associated with the second subset of BWPs.

Aspect 27: The method of any of aspects 24 through 26, wherein each BWP of the first subset of BWPs is associated with a respective BWP of the second subset of BWPs.

Aspect 28: The method of any of aspects 24 through 27, wherein two or more BWPs of the first subset of BWPs are associated with a single respective BWP of the second subset of BWPs.

Aspect 29: An apparatus for wireless communication at a UE, comprising a processor; memory coupled with the processor; and instructions stored in the memory and executable by the processor to cause the apparatus to perform a method of any of aspects 1 through 23.

Aspect 30: An apparatus for wireless communication at a UE, comprising at least one means for performing a method of any of aspects 1 through 23.

Aspect 31: A non-transitory computer-readable medium storing code for wireless communication at a UE, the code comprising instructions executable by a processor to perform a method of any of aspects 1 through 23.

Aspect 32: An apparatus for wireless communication at a device, comprising a processor; memory coupled with the processor; and instructions stored in the memory and executable by the processor to cause the apparatus to perform a method of any of aspects 24 through 28.

Aspect 33: An apparatus for wireless communication at a device, comprising at least one means for performing a method of any of aspects 24 through 28.

Aspect 34: A non-transitory computer-readable medium storing code for wireless communication at a device, the code comprising instructions executable by a processor to perform a method of any of aspects 24 through 28.

The methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc, in which disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (in other words, A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, as such, "determining" can include calculating, computing, processing, deriving, investigating, looking up (such as via looking up in a table, a database or another data structure), ascertaining and among other examples. Also, "determining" can include receiving (such as receiving information), accessing (such as accessing data in a memory) and among other examples. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. The disclosure is not limited to the examples and designs described herein but is to be accorded the broadest scope consistent with the principles and novel features disclosed herein.

What is claimed is:

1. A method for wireless communication at a user equipment (UE), comprising:

receiving control signaling indicating a configuration for a set of bandwidth parts that includes a first subset of bandwidth parts for wireless communication and a second subset of bandwidth parts for energy harvesting;

determining a set of resource patterns associated with the second subset of bandwidth parts based at least in part on the configuration;

determining a set of resources associated with at least one resource pattern of the set of resource patterns based at least in part on the configuration;

receiving a wireless communication over the first subset of bandwidth parts based at least in part on the configuration;

receiving a wireless signal for the energy harvesting over the second subset of bandwidth parts via the set of resources based at least in part on the configuration; and charging a power source associated with the UE based at least in part on the received wireless signal for the energy harvesting.

2. The method of claim 1, further comprising determining an energy rate for the energy harvesting over the second subset of bandwidth parts based at least in part on the configuration, wherein receiving the wireless signal for the energy harvesting is further based at least in part on the energy rate.

3. The method of claim 1, further comprising determining a waveform associated with the wireless signal for the energy harvesting based at least in part on the configuration, wherein receiving the wireless signal for the energy harvesting is further based at least in part on the waveform.

4. The method of claim 1, wherein the at least one resource pattern of the set of resource patterns comprises a time division duplex slot pattern, and wherein a quantity of downlink slots associated with the time division duplex slot pattern is less than a quantity of uplink slots or flexible slots associated with the time division duplex slot pattern.

5. The method of claim 1, further comprising:

selecting a resource pattern of the set of resource patterns for each of one or more bandwidth parts of the second subset of bandwidth parts based at least in part on the configuration; and transmitting, to a base station, an indication of the resource pattern, wherein receiving the wireless signal for the energy harvesting is further based at least in part on the indication.

6. The method of claim 1, further comprising:

receiving an indication to monitor one or more bandwidth parts of the second subset of bandwidth parts; and receiving a second wireless communication over the one or more bandwidth parts of the second subset of bandwidth parts.

7. The method of claim 6, wherein receiving the indication comprises receiving the indication over at least one bandwidth part of the first subset of bandwidth parts.

8. The method of claim 1, wherein receiving the control signaling indicating the configuration comprises:

receiving the control signaling indicating the configuration over at least one bandwidth part of the first subset of bandwidth parts, the configuration comprising a set of parameters associated with the second subset of bandwidth parts, wherein receiving the wireless signal for the energy harvesting is further based at least in part on the set of parameters.

9. The method of claim 8, wherein the set of parameters comprises one or more of an energy rate associated with the second subset of bandwidth parts, a resource pattern associated with the second subset of bandwidth parts, or a waveform type for the wireless signal for the energy harvesting associated with the second subset of bandwidth parts.

10. A method for wireless communication at a user equipment (UE), comprising:

receiving control signaling indicating a configuration for a set of bandwidth parts that includes a first subset of bandwidth parts for wireless communication and a second subset of bandwidth parts for energy harvesting;

transmitting an indication of one or more preferred bandwidth parts of the second subset of bandwidth parts for the energy harvesting based at least in part on the configuration;

receiving a wireless communication over the first subset of bandwidth parts based at least in part on the configuration;

receiving in accordance with the transmission of the indication, a wireless signal for the energy harvesting over the second subset of bandwidth parts based at least in part on the configuration; and charging a power source associated with the UE based at least in part on the received wireless signal for the energy harvesting.

11. The method of claim 10 further comprising:

determining channel state information for a respective bandwidth part of the second subset of bandwidth parts based at least in part on at least one respective channel measurement of the respective bandwidth part of the second subset of bandwidth parts; and selecting the one or more preferred bandwidth parts of the second subset of bandwidth parts for the energy harvesting based at least in part on the channel state information, wherein receiving the wireless signal for the energy harvesting is further based at least in part on the one or more preferred bandwidth parts.

12. The method of claim 10 further comprising:

determining an energy rate associated with each bandwidth part of the second subset of bandwidth parts based at least in part on the configuration; and selecting the one or more preferred bandwidth parts of the second subset of bandwidth parts for the energy harvesting based at least in part on the energy rate, wherein receiving the wireless signal for the energy harvesting is further based at least in part on the one or more preferred bandwidth parts.

13. A method for wireless communication at a user equipment (UE), comprising:

receiving control signaling indicating a configuration for a set of bandwidth parts that includes a first subset of bandwidth parts for wireless communication and a second subset of bandwidth parts for energy harvesting;

identifying one or more bandwidth parts of the second subset of bandwidth parts based at least in part on an association between the one or more bandwidth parts of the second subset of bandwidth parts and one or more bandwidth parts of the first subset of bandwidth parts;

receiving a wireless communication over the first subset of bandwidth parts based at least in part on the configuration;

receiving, in accordance with the association, a wireless signal for the energy harvesting over the second subset of bandwidth parts based at least in part on the configuration; and charging a power source associated with the UE based at least in part on the received wireless signal for the energy harvesting.

14. The method of claim 13, wherein the one or more bandwidth parts of the first subset of bandwidth parts and the one or more bandwidth parts of the second subset of bandwidth parts correspond to a same component carrier.

15. The method of claim 13, wherein the one or more bandwidth parts of the first subset of bandwidth parts correspond to a first component carrier and the one or more bandwidth parts of the second subset of bandwidth parts correspond to a second component carrier.

16. The method of claim 1, further comprising determining an association between a first bandwidth part of the first subset of bandwidth parts and a second bandwidth part of the second subset of bandwidth parts based at least in part on the configuration, wherein receiving the wireless signal for the energy harvesting is further based at least in part on the association.

17. The method of claim 16, wherein the first bandwidth part of the first subset of bandwidth parts overlaps the second bandwidth part of the second subset of bandwidth parts in frequency.

18. The method of claim 1, wherein each bandwidth part of the first subset of bandwidth parts is associated with a respective bandwidth part of the second subset of bandwidth parts.

19. The method of claim 1, wherein two or more bandwidth parts of the first subset of bandwidth parts are associated with a single respective bandwidth part of the second subset of bandwidth parts.

20. The method of claim 1, wherein a bandwidth part of the first subset of bandwidth parts is associated with two or more bandwidth parts of the second subset of bandwidth parts.

21. The method of claim 1, further comprising transmitting UE capability information indicating a threshold quantity of bandwidth parts for the energy harvesting, wherein receiving the control signaling indicating the configuration is further based at least in part on the UE capability information.

22. A method for wireless communication at a device, comprising:

receiving UE capability information indicating a threshold quantity of bandwidth parts for energy harvesting;

transmitting, to a user equipment (UE), control signaling indicating a configuration for a set of bandwidth parts that includes a first subset of bandwidth parts for wireless communication and a second subset of bandwidth parts for the energy harvesting;

transmitting, to the UE, a wireless communication over the first subset of bandwidth parts based at least in part on the configuration; and transmitting, to the UE in accordance with the capability information, a wireless signal for the energy harvesting over the second subset of bandwidth parts based at least in part on the configuration.

23. The method of claim 22, wherein the configuration further comprises one or more parameters associated with the second subset of bandwidth parts, the one or more parameters comprising one or more of an energy rate associated with the second subset of bandwidth parts, a resource pattern associated with the second subset of bandwidth parts, or a waveform for the wireless signal for the energy harvesting associated with the second subset of bandwidth parts.

24. An apparatus for wireless communication, comprising:

a processor;

memory coupled with the processor; and instructions stored in the memory and executable by the processor to cause the apparatus to:

receive control signaling indicating a configuration for a set of bandwidth parts that includes a first subset of bandwidth parts for wireless communication and a second subset of bandwidth parts for energy harvesting;

determining an association between a first bandwidth part of the first subset of bandwidth parts and a second bandwidth part of the second subset of bandwidth parts based at least in part on the configuration;

receive a wireless communication over the first subset of bandwidth parts based at least in part on the configuration;

receive, in accordance with the association, a wireless signal for the energy harvesting over the second subset of bandwidth parts based at least in part on the configuration; and charge a power source associated with the apparatus based at least in part on the received wireless signal for the energy harvesting.

25. The apparatus of claim 24, wherein the instructions are further executable by the processor to cause the apparatus to determine an energy rate for the energy harvesting over the second subset of bandwidth parts based at least in part on the configuration, wherein to receive the wireless signal for the energy harvesting is further based at least in part on the energy rate.

26. The method of claim 22, wherein each bandwidth part of the first subset of bandwidth parts is associated with a respective bandwidth part of the second subset of bandwidth parts, and wherein two or more bandwidth parts of the first subset of bandwidth parts are associated with a single respective bandwidth part of the second subset of bandwidth parts.

27. An apparatus for wireless communication, comprising:

a processor;

memory coupled with the processor; and instructions stored in the memory and executable by the processor to cause the apparatus to:

receive UE capability information indicating a threshold quantity of bandwidth parts for energy harvesting;

transmit, to a user equipment (UE), control signaling indicating a configuration for a set of bandwidth parts that includes a first subset of bandwidth parts for wireless communication and a second subset of bandwidth parts for the energy harvesting;

transmit, to the UE, a wireless communication over the first subset of bandwidth parts based at least in part on the configuration; and transmit, to the UE in accordance with the capability information, a wireless signal for the energy harvesting over the second subset of bandwidth parts based at least in part on the configuration.

* * * * *